(12) United States Patent
Takaku et al.

(10) Patent No.: US 7,402,331 B2
(45) Date of Patent: Jul. 22, 2008

(54) LIQUID CRYSTAL ELEMENT

(75) Inventors: Koji Takaku, Kanagawa (JP); Takashi Kato, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 11/521,437

(22) Filed: Sep. 15, 2006

(65) Prior Publication Data

US 2007/0071911 A1    Mar. 29, 2007

(30) Foreign Application Priority Data

Sep. 27, 2005  (JP)  ............................. 2005-280808

(51) Int. Cl.
C09K 19/52 (2006.01)
C09K 19/38 (2006.01)
C09K 19/60 (2006.01)

(52) U.S. Cl. ................. 428/1.1; 252/299.01; 252/299.1

(58) Field of Classification Search ................. 428/1.1; 252/299.01, 299.1, 299.5
See application file for complete search history.

(56) References Cited

U.S. PATENT DOCUMENTS 5,621,552 A * 4/1997 Coates et al. ................. 349/86
7,220,466 B2 * 5/2007 Katoh et al. ................. 428/1.1

FOREIGN PATENT DOCUMENTS

JP    05-216018    *  8/1993
JP    5-216018 A      8/1993

OTHER PUBLICATIONS

English translation by computer for JP 05-216018, http://www4.ipdl.inpit.go.jp/Tokujitu/PAJdetail.ipdl?N0000=60&NO120=01&N2001=2&N3001=H05-216018.*

* cited by examiner

Primary Examiner—Shean C Wu
(74) Attorney, Agent, or Firm—Birch, Stewart, Kolasch & Birch, LLP

(57) ABSTRACT

A liquid crystal element in which a liquid crystal layer containing at least two types of dual frequency addressable smectic liquid crystal compositions having different threshold voltage are disposed between one pair of electrodes at least one of them being a transparent electrode.

19 Claims, 4 Drawing Sheets

UPON VOLTAGE APPLICATION AT LOW FREQUENCY
(HORIZONTAL ALIGNMENT → PERPENDICULAR ALIGNMENT)

UPON VOLTAGE APPLICATION AT HIGH FREQUENCY
(PERPENDICULAR ALIGNMENT → HORIZONTAL ALIGNMENT)

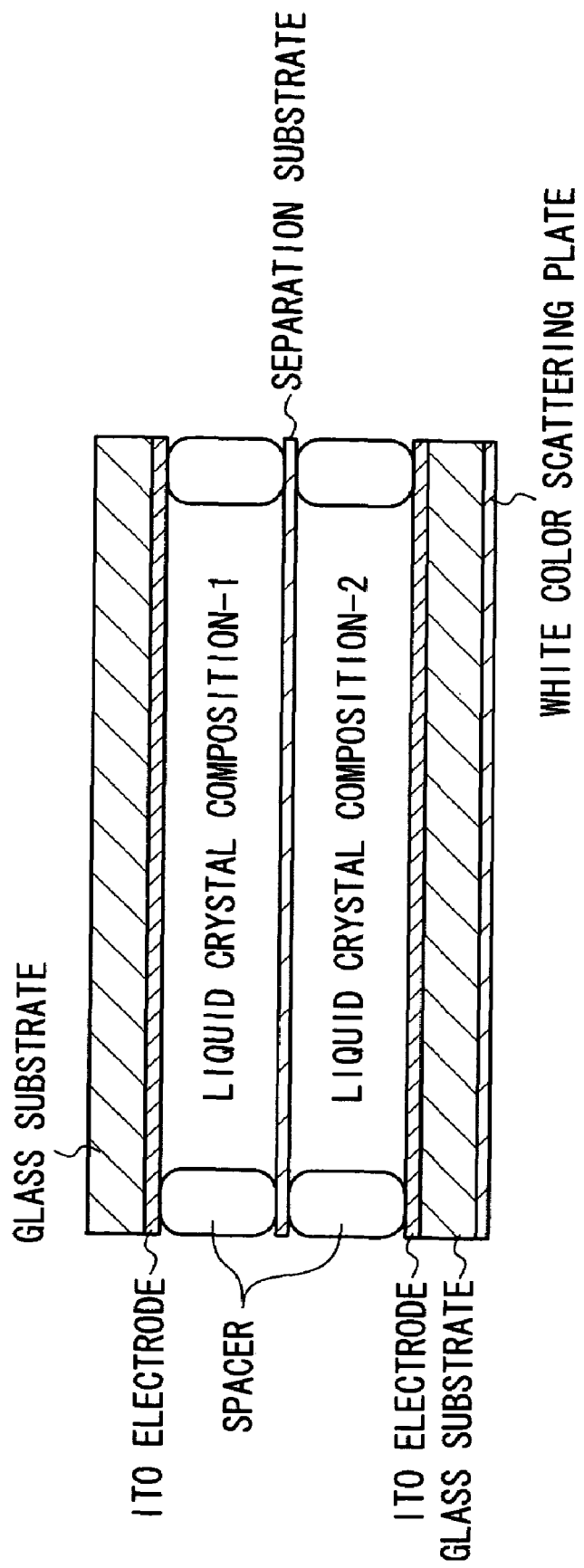

LIQUID CRYSTAL ELEMENT

CROSS REFERENCE TO RELATED APPLICATIONS

This application claims priority under 35USC 119 from Japanese Patent Application No. 2005-280808, the disclosure of which is incorporated herein by reference.

BACKGROUND OF THE INVENTION

1. Field of the Invention

The present invention concerns a liquid crystal element, and particularly, it relates to a liquid crystal element that can be utilized suitably as to a guest-host type liquid crystal element.

2. Description of the Related Art

With the spread of the digital technology, the importance of a paper type display for displaying digital information (hereinafter referred to as "electronic paper") has been increasing. The performance required for the electronic paper includes a high visual recognition and a low electric power consumption. High visual recognition means white background similar to paper, and hence a display method based on light-scattering white background similar to paper is suited. On the other hand, as to the electric power consumption, the reflection type display system has a lower power consumption as compared with that of self light-emission display system. Many systems have been proposed so far for the electronic paper. Examples include a reflection type liquid crystal display system, electrophoresis display system, magnetophoresis display system, dichroic ball rotation system, electrochromic display system, and leucothermal system. Any of these methods is not satisfactory from the viewpoint of high visual recognition, and improvement therefore has been demanded.

For the liquid crystal element (liquid crystal display element), various systems have already been proposed, and a light shutter effect has usually been utilized for the coloration of the liquid crystal element by providing red, blue, and green mosaic color filters to a liquid crystal panel, putting the liquid crystal panel between two polarizing plates, and changing the alignment direction of liquid crystals by switching on/off of a voltage. However, in this method, transmittance is decreased extremely by the color filters to result in extremely dark display.

In view of the above, a guest-host type liquid crystal element has received attention, and the method is promising as a liquid crystal element capable of bright display and suitable to reflection type display. In the guest-host type liquid crystal element, a liquid crystal composition in which a dichroic dye is dissolved in the liquid crystal is sealed in a cell, an electric field is applied, and alignment of the dichroic dye is changed along with the movement of the liquid crystals according to the electric field to change the light absorption state of the cell and thereby conduct display.

Since the liquid crystal element scarcely absorbs light in a state where the liquid crystals are aligned in the direction parallel with the electric field (direction toward the side of observation), achromatic display is possible. Accordingly, display in a wide color reproduction range is possible by laminating liquid crystal compositions containing dichroic dyes of different absorption wave lengths. However, independent addressing thereof involves a problem in that the structure is extremely complicated due to, for example, the requirement of providing an electrode for each of the layers.

On the other hand, as a method of addressing a plurality of liquid crystal layers independently by using one pair of electrodes, a method of using dual frequency addressable nematic liquid crystal and addressing in low frequency and high frequency regions while changing the state of the initial alignment of each liquid crystal layer has been disclosed, for example, in Japanese Patent Application Laid-Open (JP-A) No. 5-216018, etc. However, the liquid crystal element described above involves problems in that the color reproduction range is narrow due to the color combination of a complimentary color relationship and in that the state can not be maintained when the voltage application is stopped, thereby there is no memory property.

Accordingly, it has been desired to provide a liquid crystal element and a color display method capable of addressing respective liquid crystal layers independently by one pair of electrodes and having a memory property. Further, since such a technique would also be useful in a case where a dye is not contained (colorless), the reflective index could be changed in the depth direction, and the reflective index could be modulated freely by one pair of electrodes, it could be applied, for example, to reflective index modulating material or a material for changing an image depending on the viewing angle.

BRIEF DESCRIPTION OF THE DRAWINGS

FIG. 4 is a schematic cross sectional view of a liquid crystal element in Embodiment 1.

SUMMARY OF THE INVENTION

Figure 1A:
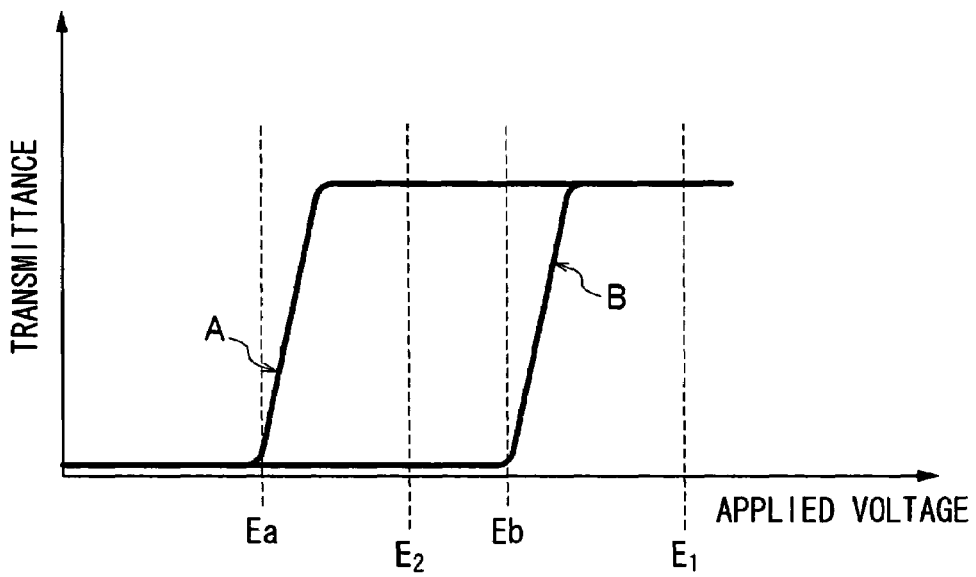
FIG. 1 is a graph for explaining a relationship between a threshold voltage and a transmittance at a low frequency and a high frequency in two types of dual frequency addressable smectic liquid crystal compositions.

The present invention has been made in view of the above circumstances, and a first aspect thereof is to provide a liquid crystal element comprising one pair of electrodes of which at least one is a transparent electrode and a liquid crystal layer between the pair of the electrodes, wherein the liquid crystal layer contains at least two types of dual frequency addressable smectic liquid crystal compositions having different threshold voltages.

DETAILED DESCRIPTION OF THE INVENTION

In the liquid crystal element according to the present invention, a liquid crystal layer containing at least two types of dual frequency addressable smectic liquid crystal compositions having different threshold voltages is provided between one pair of electrodes, at least one of which being a transparent electrode.

The guest-host color display systems utilizing the dual frequency addressable nematic liquid crystal that have been reported so far involve problems in that image quality is low and the image is not held in a case where a voltage is not applied (no memory property). Then, as a result of earnest study, it was found that the use of a dual frequency addressable smectic liquid crystal is extremely useful, which led to the achievement of the present invention.

Further, since the dual frequency addressable smectic liquid crystals that have been reported so far are in a crystallized state at a room temperature, the threshold voltage is extremely high, and the viscosity is also high, they have been difficult to use suitably for display. Then as a result of earnest study, it was found that the dielectric characteristic and the viscosity can be controlled easily by mixing a smectic liquid crystal with a dual frequency addressable nematic liquid crystal, whereby the threshold voltage and the response time can be lowered, which led to the achievement of the present invention.

The present invention will be described in detail below. In the present specification " . . . to . . . " indicates a range including the numerical values indicated before and after "to" as a minimum value and a maximum value, respectively.

The display method of the liquid crystal element according to the present invention will be described first, and then various constitutions for the liquid crystal element will be described.

1. Display Method

The liquid crystal composition of the present invention is at least two types of the dual frequency addressable smectic liquid crystal composition having different threshold voltages in one or plurality of liquid crystal layers.

In the present invention, the dual frequency addressable liquid crystal is a liquid crystal in which the sign of the dielectric anisotropy changes from positive to negative by increasing the frequency of an applied voltage. In the case of using the dual frequency addressable liquid crystal, a plurality of liquid crystal compositions can be addressable independently by one pair of electrodes by controlling the frequency and the voltage to be applied.

Further, in the present invention, the dual frequency addressable smectic liquid crystal means a combination of a dual frequency addressable nematic liquid crystal and a smectic liquid crystal, a combination of a dual frequency addressable nematic liquid crystal and a dual frequency addressable smectic liquid crystal, or a dual frequency addressable smectic liquid crystal. Another liquid crystal may further be added thereto and used in the combination.

Since the dual frequency addressable smectic liquid crystal composition according to the present invention is in a smectic phase, it has a memory property. Accordingly, In the case of using the dual frequency addressable smectic liquid crystal of the present invention, since the state of alignment can be controlled by the application of voltage, no alignment layer is necessary which can make the element constitution simple and simplify the manufacturing process. Further, in a case where the alignment layer is not present, since there is no light absorption or reflection by the alignment layer, the display performance is improved to provide high reflectance in a reflection type display.

The liquid crystal element of the present invention preferably contains two or more types, and more preferably three types of dual frequency addressable smectic liquid crystal compositions having different threshold voltages. For controlling the threshold voltage of the dual frequency addressable smectic liquid crystal composition, it is preferable to properly select the host liquid crystal, and the threshold voltage for the dual frequency addressable smectic liquid crystal composition can be changed by controlling the type of functional groups, substitution positions and the length of the terminal substituents in the host liquid crystal.

The following relationship is established between the threshold voltage and the dielectric anisotropy of the smectic A liquid crystal in which the threshold voltage lowers as the dielectric anisotropy increases. Accordingly, a plurality of liquid crystal compositions can be addressable independently by changing the applied voltage while considering the threshold voltage for each of the liquid crystal layers.

$$Vc = 8\pi^2 d(K_{11}B)^{1/2} \cdot (\epsilon /// (\epsilon\perp \cdot \Delta\epsilon))$$

in which Vc is the threshold voltage, $K_{11}$ is an elastic constant, B is a coefficient representing the layer elasticity of a smectic phase, $\Delta\epsilon$ is the dielectric anisotropy ($\epsilon//$ is a dielectric constant in the direction of the molecular major axis, $\epsilon\perp$ is a dielectric constant in the direction of the molecular minor axis), and d is a cell gap.

Since the response speed of a liquid crystal composition is slow, it is difficult to measure the threshold voltage of the liquid crystal composition by an apparatus usually used for nematic liquid crystals. Accordingly, the value for the threshold voltage of a liquid crystal composition can be determined by measuring the change in the absorptivity after applying a voltage for a predetermined time.

The threshold voltage for the dual frequency addressable smectic liquid crystal composition of the present invention will now be described.

Assuming the threshold voltages for two or more types of the dual frequency addressable smectic liquid crystal composition at a low frequency are Ea, Eb, Ec, - - - Ex, respectively, the threshold voltages thereof at a high frequency are E'a, E'b, E'c, - - - E'x, respectively, it is preferred that they have the relationships: Ea<Eb<Ec---<Ex and E'a<E'b<E'c---<E'x. An identical suffix (a, b - - - x) represents an identical dual frequency addressable smectic liquid crystal composition. For example, in a case where the dual frequency addressable smectic liquid crystal compositions comprise three types of the compositions, the relationships: Ea<Eb<Ec, and E'a<E'b<E'c are preferred assuming Ea is a threshold voltage of a first dual frequency addressable smectic liquid crystal composition at a low frequency, E'a is a threshold voltage at a high frequency of the composition, Eb is a threshold voltage at a low frequency of a second dual frequency addressable smectic liquid crystal composition, E'b is a threshold voltage at a high frequency of the composition, Ec is a threshold voltage at a low frequency of a third dual frequency addressable smectic liquid crystal composition, and E'c is a threshold voltage at a high frequency of the composition.

Each of the threshold voltages Ea, Eb, Ec - - - Ex, and E'a, E'b, E'c - - - E'x is within a range of preferably from 0 V/µm to 30 V/µm, more preferably from 1 V/µm to 20 V/µm, and further preferably from 1 V/µm to 10 V/µm.

The differences between the threshold voltages of the dual frequency addressable smectic liquid crystal composition at a specific frequency, for example, the difference between Ea and Eb, and the difference between Eb and Ec, or the difference between E'a and E'b, and the difference between E'b and E'c, etc. are preferably from 0.1 V/µm to 15 V/µm, more preferably from 0.1 V/µm to 5 V/µm, and particularly preferably from 0.2 V/µm to 2 V/µm, independently from each other.

For the addressable of the liquid crystal element of the present invention, a voltage in a low frequency region and that in a high frequency region are used. While a preferred range of the frequency region of the voltage applied to the liquid crystal layer is different, for example, depending on the type of the liquid crystal composition used, the cross-over frequency of the liquid crystal composition (threshold frequency at which the sign of the dielectric constant anisotropy $\Delta\epsilon$ changes), etc., the frequency region of the electric field applied generally to the liquid crystal composition is preferably from 0.1 Hz to 10 MHz, and more preferably from 1 Hz to 1 MHz. The low frequency region to be used generally ranges preferably from 0.1 Hz to 100 kHz, more preferably from 1 Hz to 10 kHz, and further preferably from 10 Hz to 10 kHz. Further, the high frequency region to be used generally ranges preferably from 100 Hz to 10 MHz, more preferably from 100 Hz to 1 MHz, and further preferably from 1 kHz to 1 MHz.

Further, the dual frequency addressable smectic liquid crystal compositions of the present invention are preferably liquid crystal compositions having different cross-over frequencies. In a case where the cross-over frequencies are different, each of the liquid crystal compositions can also be controlled depending on the frequency in addition to the threshold voltage.

By the use of the liquid crystal element described above, color display with high image quality is possible even with a simple and convenient constitution using only one pair of electrodes.

The color display method using the liquid crystal element of the present invention is will be described in more detail.

Figure 1B:
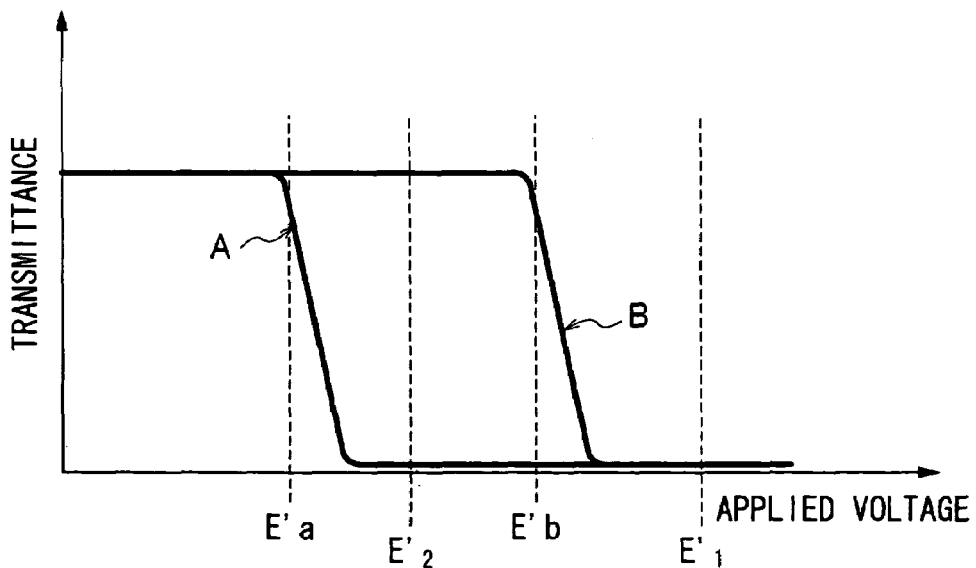

1-1. Constitution with Two Types of the Dual Frequency Addressable Smectic Liquid Crystal Composition Having Different Threshold Voltages FIG. 1 shows the "relationship between threshold voltage and transmittance at low frequency and high frequency" in two types of dual frequency addressable smectic liquid crystal compositions. A guest-host liquid crystal element using a liquid crystal composition containing the two types of the dual frequency addressable smectic liquid crystal compositions and dichroic dyes exhibiting colors A and B can display the colors of white, black, A, and B by using a white scattering plate.

Below, a dual frequency addressable smectic liquid crystal composition containing a dichroic dye exhibiting color A is referred to as 'liquid crystal composition A' and a dual frequency addressable smectic liquid crystal composition containing a dichroic dye exhibiting color B which is a color complementary to A is referred to as "liquid crystal composition B". The color A and the color B are in a relationship in which they are complementary to each other such as "blue and yellow", "green and magenta", "red and cyan", etc.

Description will be made for an example in a case where the liquid crystal compositions are subjected to alignment treatment such that the state of initial alignment is in a horizontal alignment, both of the two liquid crystal compositions have a dielectric constant anisotropy Δε which is positive at a low frequency and becomes negative at a high frequency, and the dichroic dyes are of a positive type.

In FIG. 1, $E_1$ is a voltage which is higher than the respective threshold voltages Ea and Eb at a low frequency in each of the two liquid crystal compositions A and B. $E_2$ is a voltage which is higher than the threshold voltage Ea for the liquid crystal composition A at the low frequency, and which is lower than the threshold voltage Eb for the liquid crystal composition B at the low frequency.

$E'_1$, is a voltage which is higher than the respective threshold voltages E'a and E'b at a high frequency in each of the two liquid crystal compositions A and B. $E'_2$ is a voltage which is higher than the threshold voltage E'a for the liquid crystal composition A at the high frequency, and which is lower than the threshold voltage E'b for the liquid crystal composition B at the high frequency. That is, the relationships between the voltages described above are as shown below.

$$Ea < E_2 < Eb < E_1 \quad (1)$$

$$E'a < E'_2 < E'b < E'_1 \quad (2)$$

In a case where no voltage is applied in the initial alignment state, both of the dual frequency addressable smectic liquid crystal compositions contained in the two liquid crystal compositions A and B are in a horizontal alignment, and correspondingly, the dichroic dyes are also in a horizontal alignment. Since the dichroic dyes of the positive type as described above, the dichroic dyes in the horizontal alignment exhibit respective colors. In this case, since the dichroic dyes contained in the dual frequency addressable smectic liquid crystal compositions respectively exhibit colors A and B which have a complementary relationship, they display a black color in admixture.

Then, when the voltage $E_2$ is applied at the low frequency, the alignment of the liquid crystal contained in the liquid crystal composition A changes since the voltage higher than the threshold voltage Ea of the dual frequency addressable smectic liquid crystal composition contained in the liquid crystal composition A has been applied. Since the dual frequency addressable smectic liquid crystal composition used herein has a positive dielectric constant anisotropy Δε, the alignment of the liquid crystal changes in a direction identical to the electric field generated by the application of the voltage. As a result, the liquid crystal is aligned perpendicular to the substrate, and correspondingly, the dichroic dye is also aligned in the perpendicular direction. Since the dichroic dye is of the positive type, it ceases to exhibit a color when aligned in the perpendicular direction. That is, only the color B of the dichroic dye contained in the liquid crystal composition B is exhibited.

When the voltage $E_1$ is applied at the low frequency, the alignment of the liquid crystal contained in the liquid crystal composition B changes since the voltage higher than the threshold voltage Eb of the dual frequency addressable smectic liquid crystal composition contained in the liquid crystal composition B has been applied. The alignment direction changes in the same manner as in the liquid crystal composition A, and as a result, the dichroic dye contained in the liquid crystal composition B also ceases to exhibit color. That is, since neither of the dichroic dyes contained in the liquid crystal composition A and the liquid crystal composition B exhibits color, white color is displayed by the white scattering plate.

After the application of the voltage $E_1$ at the low frequency, when the frequency is changed to a high frequency, the sign of the dielectric anisotropy changes and switches from positive to negative. When the voltage $E'_2$ is applied, in the liquid crystals contained in the liquid crystal compositions A and B both of which were aligned in the perpendicular direction, only the liquid crystal contained in the liquid crystal composition A undergoes a change in alignment from the perpendicular direction to the horizontal direction. Thus, the dichroic dye contained in the liquid crystal composition A is also aligned in the horizontal direction, and the positive type dichroic dye exhibits color A. Since the alignment of the liquid crystal composition B is kept as it is, it does not exhibit color. As a result only the color A is exhibited to display the color A.

When the applied voltage $E'_2$ is changed to the voltage $E'_1$, the alignment of the liquid crystal contained in the liquid crystal composition B also changes from the perpendicular direction to the horizontal direction, the dichroic dye contained in the liquid crystal composition B is thereby aligned in the horizontal direction, and the positive type dichroic dye exhibits color B. As a result, colors A and B are exhibited, and since they have a complementary relationship, they display a black color in admixture.

From the foregoing, display of the colors white, black, A, and B can be carried out. The operations are summarized in the following Table 1. In the Table "⇒" indicates that a next voltage is applied after the application of voltage.

TABLE 1

| Display | Operation |
|---|---|
| White | $E_1$ at low frequency |
| Black | No application, or $E'_1$ at high frequency |
| Color A | $E_1$ at low frequency ⇒ $E'_2$ at high frequency |
| Color B | $E_2$ at low frequency |

In the example described above, while the state of initial alignment has been explained for a case in which the alignment is in the horizontal direction, the invention is not limited thereto.

Figure 2:
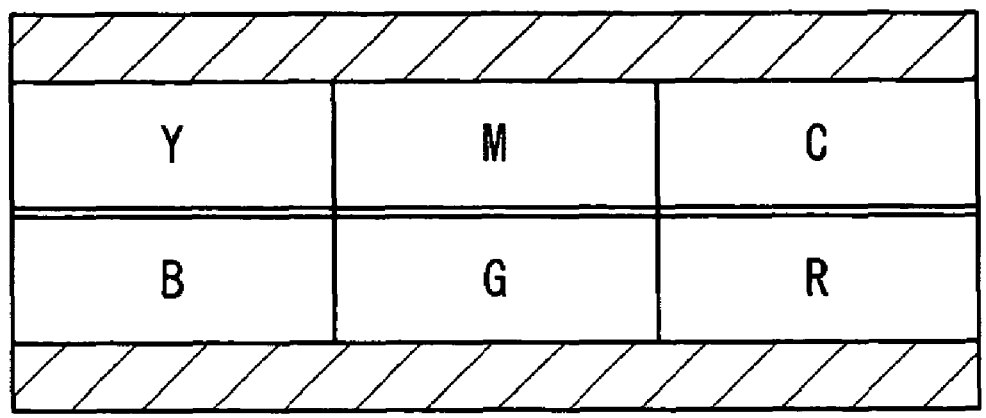
FIG. 2 is a view showing an example of a liquid crystal layer in a state of lamination and side-by-side arrangement in a liquid crystal element according to the present invention.

Further, as shown in the cross sectional view in FIG. 2, in the guest-host liquid crystal element which has complementary color relationships in the direction of lamination, full color display can be attained by side by side arrangement of liquid crystal elements of blue (B), green (G), and red (R).

Figure 3A:
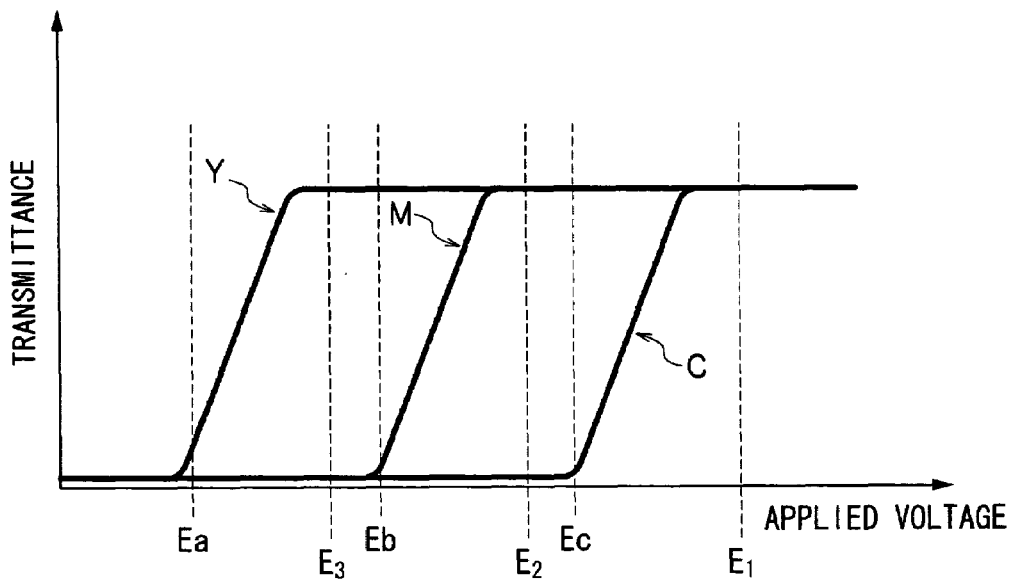
FIG. 3 is a graph for explaining a relationship between a threshold voltage and a transmittance at a low frequency and a high frequency in three types of dual frequency addressable smectic liquid crystal compositions.
Figure 3B:
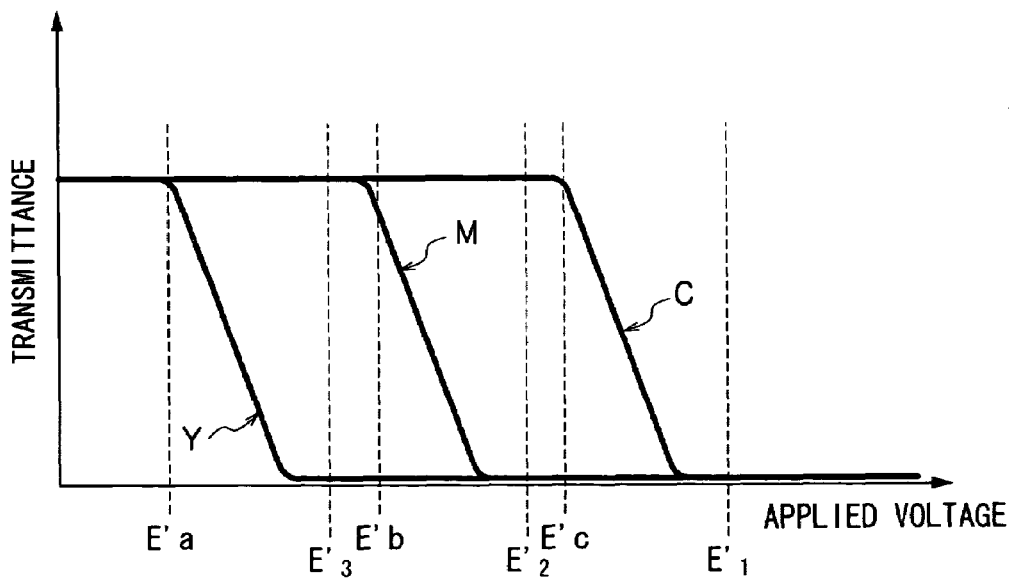

1-2. Constitution with Three Types of the Dual Frequency Addressable Smectic Liquid Crystal Compositions Having Different Threshold Voltage FIG. 3 shows the "relationship between threshold voltage and transmittance at low frequency and high frequency" in three types of the dual frequency addressable smectic liquid crystal composition. A guest-host liquid crystal element using a liquid crystal composition containing the three types of the dual frequency addressable smectic liquid crystal composition and dichroic dyes exhibiting three colors of yellow, magenta, and cyan can perform full-color display by using a white scattering plate.

Below, a dual frequency addressable smectic liquid crystal composition containing a dichroic dye exhibiting yellow color is referred to as "liquid crystal composition Y", a dual frequency addressable smectic liquid crystal composition containing a dichroic dye of magenta is referred to as "liquid crystal composition M", and a dual frequency addressable smectic liquid crystal composition containing a dichroic dye of cyan is referred to as "liquid crystal composition C".

Description will be made for an example in a case where the liquid crystal compositions are subjected to alignment treatment such that the state of initial alignment is in a horizontal alignment, all of three types of liquid crystal compositions have a dielectric constant anisotropy Δε which is positive at a low frequency and becomes negative at a high frequency, and the dichroic dyes are of a positive type.

In FIG. 3, $E_1$ is a voltage higher than the respective threshold voltage Ea, Eb and Ec at a low frequency for each of three types of the liquid crystal compositions Y, M and C. $E_2$ is a voltage higher than the respective threshold voltages Ea and Eb of the liquid crystal compositions Y and M at the low frequency and lower than the threshold voltage Ec of the liquid crystal composition C at the low frequency. $E_3$ is a voltage higher than the threshold voltage Ea for the liquid crystal composition Y at the low frequency and lower than the respective threshold voltages Eb and Ec of the liquid crystal compositions B and C at the low frequency.

$E'_1$ is a voltage higher than the respective threshold voltages E'a, E'b and E'c at a high frequency in each of the three types of liquid crystal compositions Y, M and C. $E'_2$ is a voltage higher than the respective threshold voltages E'a and E'b for the liquid crystal compositions Y and M at the high frequency and lower than the threshold voltage E'c for the liquid crystal composition C at the high frequency. $E'_3$ is a voltage higher than the threshold voltage E'a for the liquid crystal composition Y at the low frequency and lower than the respective threshold voltages E'b and E'c for the liquid crystal compositions M and C at the low frequency. The relationships for the voltages described above are as shown below.

$$Ea < E_3 < Eb < E_2 < Ec < E_1 \quad (1)$$

$$E'a < E'_3 < E'b < E'_2 < E'c < E'_1 \quad (2)$$

In a case where no voltage is applied the voltage in the initial alignment state, all of the dual frequency addressable smectic liquid crystals contained in the three types of liquid crystal compositions A, B and C are in the horizontal alignment, and correspondingly, the dichroic dyes are also in a horizontal alignment. Since the dichroic dyes are the positive type as described above, the dichroic dyes in the horizontal alignment exhibit respective colors. In this case, since the dichroic dyes contained in the three liquid crystal composition respectively exhibit colors of yellow (Y), magenta (M), and cyan (C), they display a black color in admixture.

Then, when the voltage $E_3$ is applied at the low frequency, the alignment of the liquid crystal contained in the liquid crystal composition Y changes since the voltage higher than the threshold voltage Ea of the dual frequency addressable smectic liquid crystal composition contained in the liquid crystal composition Y has been applied. Since the dual frequency addressable smectic liquid crystal composition used herein has positive dielectric constant anisotropy Δε, the alignment of the liquid crystal changes in a direction identical to the electric field generated by the application of the voltage. As a result, the liquid crystal is aligned perpendicular to the substrate, and correspondingly, the dichroic dye is also aligned in the perpendicular direction. Since the dichroic dye is of the positive type, it ceases to exhibit a color when aligned in the perpendicular direction. That is, magenta and cyan due to the liquid crystal compositions M and C are exhibited to display blue in admixture.

When the voltage $E_2$ is applied at the low frequency, the alignment of the liquid crystal contained in the liquid crystal composition M changes since the voltage higher than the threshold voltage Eb of the dual frequency addressable smectic liquid crystal composition contained in the liquid crystal composition M has been applied. The alignment direction changes in the same manner as in the liquid crystal composition Y, and as a result, the dichroic dye contained in the liquid crystal composition M also ceases to exhibit color. That is, neither of the dichroic dyes contained in the liquid crystal compositions Y and M exhibits color, only the dichroic dye contained in the liquid crystal composition C exhibits color, and as a result, cyan is displayed.

When the voltage $E_3$ is applied at the low frequency, the alignment of the liquid crystal contained in the liquid crystal composition C also changes since a voltage higher than the threshold voltage Ec of the dual frequency addressable smectic liquid crystal composition contained in the liquid crystal composition C has been applied. As a result, all the dichroic dyes contained in the liquid crystal compositions Y, M and C do not exhibit colors and white color is displayed by a white scattering plate.

On the other hand, after the application of the voltage $E_1$ at the low frequency, when the frequency is changed to a high frequency, the sign of the dielectric anisotropy changes and switches from positive to negative. When the voltage at $E'_3$ is applied, in the liquid crystals contained in the liquid crystal compositions Y, M and C, all of which were aligned in the perpendicular direction, only the liquid crystal contained in the liquid crystal composition Y undergoes a change in alignment to the horizontal direction. Thus dichroic dye contained in the liquid crystal composition Y is also aligned in the horizontal direction, and the positive type dichroic dye exhibits a yellow color. Since the alignments of the liquid crystal compositions M and C are kept as it is, they do not exhibit color. As a result, a yellow color is displayed.

After the application of the voltage $E_1$ at the low frequency, when the voltage E', at the high frequency is applied, the alignments of the liquid crystals contained in the liquid crystal compositions Y and M undergo a change in alignment from the perpendicular direction to the horizontal direction. Since also the dichroic dyes are aligned in the horizontal direction, the positive dichroic dyes exhibit color. As a result, yellow and magenta are exhibited by the dichroic dyes contained in the liquid crystal composition Y and M and they display a red color in admixture.

When the frequency is changed from the high frequency to the low frequency in a state of displaying the red color, the sign of the dielectric anisotropy changes again and switches from negative to positive. When the voltage $E_3$ is applied, in the liquid crystals contained in the liquid crystal compositions Y and M aligned in the horizontal direction, since only the liquid crystal contained in the liquid crystal composition Y changes the alignment in the perpendicular direction, the dichroic dye contained in the liquid crystal composition Y also ceases to exhibit color. As a result, only the liquid crystal composition M is aligned in the horizontal direction and the dichroic dye contained therein displays magenta.

Further, when the frequency is changed from the high frequency to the low frequency after applying the voltage $E_2$ at the low frequency, the sign of the dielectric anisotropy changes and switches from positive to negative. In this case, when the voltage $E'_3$ is applied, in the liquid crystal contained in the liquid crystal compositions Y and M aligned in the perpendicular direction, only the liquid crystal contained in the liquid crystal composition Y undergoes a change in alignment in the horizontal direction. As a result, the liquid crystal compositions C and Y are aligned in the horizontal direction, and the dichroic dyes contained therein exhibit cyan and yellow and display green in admixture.

Further, when voltage $E'_1$ at the high frequency is applied, all the liquid crystal compositions Y, M and C are aligned in the horizontal direction, and since all the dichroic dyes contained therein exhibit colors, they display a black color in admixture.

From the foregoing, full color of white, black, yellow, magenta, cyan, blue, green, and red can be displayed. The operations are summarized in the following Table 2. In the Table "⇒" indicates that a succeeding voltage is applied after the voltage application.

TABLE 2

| Display | Operation |
|---|---|
| White | $E_1$ at low frequency |
| Black | No application, or $E'_1$ at high frequency |
| Yellow | $E_1$ at low frequency ⇒ $E'_3$ at high frequency |
| Magenta | $E_1$ at low frequency ⇒ $E'_2$ at high frequency ⇒ $E_3$ at low frequency |
| Cyan | $E_2$ at low frequency |
| Blue | $E_3$ at low frequency |
| Green | $E_2$ at low frequency ⇒ $E'_3$ at high frequency |
| Red | $E_1$ at low frequency ⇒ $E'_2$ at high frequency |

In the example described above, while the state of initial alignment has been explained for a case in which the alignment is in the horizontal direction, the present invention is not limited thereto. Further, the order for the level of the respective threshold voltages for Y, M and C is not restricted to: Y<M<C but may in any of: Y<C<M, M<Y<C, M<C<Y, C<M<Y, and C<Y<M.

The liquid crystal element of the present invention can be addressable by a simple matrix addressing system or an active matrix addressing system using, for example, a thin film transistor (TFT). The addressing system is described specifically, for example, in "Liquid Crystal Device Handbook" (edited by Japan Society for the Promotion of Science, the 142th Committee, published from Nikkan Kogyo Shinbunsha, 1989), pp 387 to 460, which can be utilized as the addressing method for the liquid crystal element of the present invention.

2. Liquid Crystal Layer

The liquid crystal layer according to the present invention at least contains a dual frequency addressable smectic liquid crystal composition.

2-1. Dual Frequency Addressable Smectic Liquid Crystal Composition

The dual frequency addressable smectic liquid crystal composition according to the present invention is a composition showing dual frequency addressing property and containing a smectic liquid crystal. The dual frequency addressing property means a property of a liquid crystal in which the sign of the dielectric anisotropic changes from positive to negative by increasing the frequency of the voltage to be applied to the liquid crystal. In this case, the alignment treatment is conducted preferably such that the initial alignment is in the horizontal direction.

The dual frequency addressable smectic liquid crystal composition according to the present invention includes a combination of a dual frequency addressable nematic liquid crystal and a smectic liquid crystal, a combination of the dual frequency addressable nematic liquid crystal and a dual frequency addressable smectic liquid crystal composition, or a dual frequency addressable smectic liquid crystal composition, and the liquid crystal composition is in a smectic A phase at a room temperature. A liquid crystal may further be added thereto and used in combination.

With a view point of the liquid crystallinity and the dielectric characteristic, the viscosity control of the composition, etc. a preferred dual frequency addressable smectic liquid crystal composition is a mixture of a smectic liquid crystal and dual frequency addressable nematic liquid crystal. The smectic liquid crystal may also exhibit the dual frequency addressing property.

In the mixture, while the content of the smectic liquid crystal and the dual frequency addressable nematic liquid crystal may be at any ratio, "dual frequency addressable nematic liquid crystal: smectic liquid crystal" is preferably from 20 mol %:80 mol % to 99 mol %:1 mol %, more preferably from 50 mol %:50 mol % to 95 mol %: 5 mol %, and further preferably from 70 mol %:30 mol % to 90 mol %:10 mol %. In a case where the ratio of the smectic liquid crystal is more than 80 mol % based on 20 mol % of the dual frequency addressable nematic liquid crystal, it does not form a liquid crystal phase at a room temperature or the viscosity is increased which is not preferred. Further, in a case where the ratio of the smectic liquid crystal is less than 1 mol % based on 99 mol % of the dual frequency addressable nematic liquid crystal, the smectic phase A often fails to be developed, which is not preferred.

(1) Dual Frequency Addressable Nematic Liquid Crystal

The dual frequency addressable nematic liquid crystal is described specifically in "liquid Crystal Device Handbook" (edited by Japan Society for the Promotion of Science, the 142th Committee, published from Nikkan Kogyo Shinbunsha, 1989), pp189 to 192. As a specific example, the following dual frequency addressable nematic liquid crystal manufactured by Eastman Kodak Co. shown below.

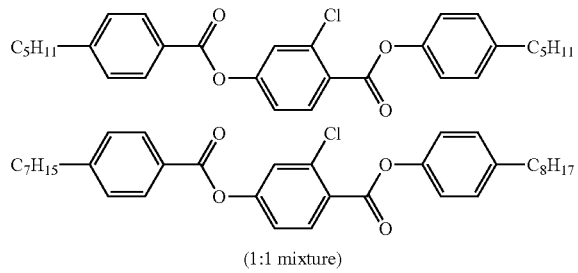

(1:1 mixture)

In addition, commercially available dual frequency addressable liquid crystal material includes, for example, DF-02XX, DF-05XX, FX-1001, FX-1002, manufactured by Chisso Co. and MLC-2048 manufactured by Merck Co.

(2) Dual Frequency Addressable Smectic Liquid Crystal

Dual frequency addressable smectic liquid crystal is described specifically in Mol. Cryst. Liq. Cryst., Vol. 49, pp 83 to 87 (1978). In the present invention, such descriptions can be applied appropriately.

(3) Smectic Liquid Crystal

The smectic liquid crystal that can be used together with the dual frequency addressable liquid crystal is not particularly restricted so long as this is a liquid crystalline compound developing the smectic phase and includes preferably those developing the smectic A phase (sometimes referred to as SmA) with a view point of the response speed (liquid crystal viscosity) and the contrast ratio (showing the optical axis substantially at 90° relative to the substrate in the perpendicular aligned state, with less absorption in the colorless display state), and more preferably a smectic A liquid crystal showing dual frequency addressing property. As the liquid crystal compound described above, those compounds represented by the following Formula (4) are particularly preferred.

$$T^1-\{(D^1)_e-L^1\}_m-(D^2)_k-T^2 \qquad \text{Formula (4)}$$

In the Formula (4), $D^1$ and $D^2$ each independently represents an arylene group, a heteroarylene group or a bivalent alicyclic hydrocarbon group.

The arylene group represented by $D_1$ and $D_2$ is an arylene group having preferably 6 to 20 carbon atoms, more preferably 6 to 10 carbon atoms. Specific examples of the preferred an arylene group include a phenylene group and a naphthalene group, and particularly preferably a substituted phenylene group, more preferably 1,4-phenylene group.

The heteroarylene group represented by $D_1$ and $D_2$ is a heteroarylene group having preferably 1 to 20 carbon atoms, more preferably 2 to 9 carbon atoms. Specific examples of the preferred heteroarylene group include groups comprising a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring, and a triazole ring, and a heteroarylene group obtained by removing each one hydrogen from two carbon atoms of a condensation ring formed by condensing those groups.

The bivalent alicyclic hydrocarbon group represented by $D_1$ and $D_2$ is a bivalent alicyclic hydrocarbon group having preferably 3 to 20, more preferably 4 to 10 carbon atoms. Specific examples of the preferred bivalent alicyclic hydrocarbon group include cyclohexanediyl, cyclopentanediyl more preferably cyclohexane-1,2-diyl, cyclohexane-1,3-diyl, cyclohexane-1,4-diyl, cyclopentane-1,3-diyl, and particularly preferably (E)-cyclohexane-1,4-diyl.

The bivalent arylene group, a bivalent heteroarylene group, and a bivalent alicyclic hydrocarbon group represented by $D_1$ and $D_2$ are those which may have or may not have a substituent. Further, in a case where e, m or k is 2 or greater in the formula (3), a plurality of $D_1$ and $D_2$ each may independently have a substituent, may have the same substituent and may have different substituents, or may not have a substituent.

Those substituents include the substituent group V to be described below.

(Substituent Group V)

The substituent group V includes, for example, a halogen atom (for example, chlorine, bromine, iodine, or fluorine), a mercapto group, a cyano group, a carboxyl group, a phosphate group, a sulfo group, a hydroxy group, a carbamoyl group having 1 to 10 carbon atoms, preferably 2 to 8 carbon atoms, more preferably 2 to 5 carbon atoms (for example, methylcarbamoyl, ethylcarbamoyl, and morpholinocarbamoyl), a sulfamoyl group having 0 to 10 carbon atoms, preferably 2 to 8 carbon atoms, more preferably 2 to 5 carbon atoms, (for example, methylsulfamoyl, ethylsulfamoyl and piperidinosulfamoyl), a nitro group, an alkoxy group having 1 to 20 carbon atoms, preferably 1 to 10 carbon atoms, more preferably 1 to 8 carbon atoms (for example, methoxy, ethoxy, 2-methoxyethoxy and 2-phenylethoxy), an aryloxy group having 6 to 20 carbon atoms, preferably 6 to 12 carbon atoms, more preferably 6 to 10 carbon atoms (for example, phenoxy, p-methyphenoxy, p-chlorophenoxy, and naphthoxy), an acyl group having 1 to 20 carbon atoms, preferably 2 to 12 carbon atoms, more preferably 2 to 8 carbon atoms, (for example, acetyl, benzoyl and trichloroacetyl), an acyloxy group having 1 to 20 carbon atoms, preferably 2 to 12 carbon atoms, more preferably 2 to 8 carbon atoms (for example, acytyloxy and benzoyloxy), an acylamino group having 1 to 20 carbon atoms, preferably 2 to 12 carbon atoms, more preferably 2 to 8 carbon atoms (for example, acetylamino), a sulfonyl group having 1 to 20 carbon atoms, preferably 1 to 10 carbon atoms, more preferably 1 to 8 carbon atoms (for example, methane sulfonyl, ethane sulfonyl or benzenze sulfonyl), a sulfinyl group having 1 to 20 carbon atoms, preferably 1 to 10 carbon atoms, more preferably 1 to 8 carbon atoms (for example, methanesulfonyl, ethanesulfonyl, and benzenesulfonyl), a substituted or unsubstituted amino group having 1 to 20 carbon atoms, preferably 1 to 12 carbon atoms, more preferably 1 to 8 carbon atoms (for example, amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethylphenylamino, 4-trifluoromethylphenylamino, 2-pyridylamino, 3-pyridylamino, 2-thiozorylamino, 2-oxazorylamino, N,N-methylphenylamino, and N,N-ethylphenylamino), an ammonium group having 0 to 15 carbon atoms, preferably 3 to 10 carbon atoms, more preferably 3 to 6 carbon atoms (for example, trimetylammonium, and triethyl ammonium), a hydrazino group having 0 to 15 carbon atoms, preferably 1 to 10 carbon atoms, and more preferably 1 to 6 carbon atoms (for example, trimethyl hydrazine), an ureido group having 1 to 15 carbon atoms, preferably 1 to 10 carbon atoms, more preferably 1 to 6 carbon atoms (for example, ureido group, and N,N-dimethylureido group), an imido group having 1 to 15 carbon atoms, and preferably 1 to 10 carbon atoms, more preferably 1 to 6 carbon atoms (for example, succineimide group), an alkylthio group having 1 to 20 carbon atoms, preferably 1 to 12 carbon atoms, more preferably 1 to 8 carbon atoms (for example, methylthio, ethylthio, and propylthio), an arylthio group having 6 to 80 carbon atoms, preferably 6 to 40 carbon atoms, more preferably 6 to 30 carbon atoms (for example, phenylthio, p-methylphenylthio, p-chlorophenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio, and 4-propylphenyl-2-ethynyl-4'-biphenylthio), a heteroarylthio group having 1 to 80 carbon atoms, preferably 1 to 40 carbon atoms, more preferably 1 to 30 carbon atoms (for example, 2-pyridylthio, 3-pyridylthio, 4-pyridylthio, 2-quinorylthio, 2-furylthio, or 2-pyrolylthio), an alkoxycarbonyl group having 2 to 20 carbon atoms, preferably 2 to 12 carbon atoms, more preferably 2 to 8 carbon atoms (for example, methoxycarbonyl, ethoxycarbonyl, and 2-benzyloxycarbonyl), an aryloxycarbonyl group having 6 to 20 carbon atoms, preferably 6 to 12 carbon atoms, more preferably 6 to 10 carbon atoms (for example, phenoxycarbonyl), an unsubstituted alkyl group having 1 to 18 carbon atoms, preferably 1 to 10 carbon atoms, more preferably 1 to 5 carbon atoms (for example, methyl, ethyl, propyl, and butyl), a substituted alkyl group having 1 to 18 carbon atoms, preferably 1 to 10 carbon atoms, more preferably 1 to 5 carbon atoms (for example, hydroxymethyl, trifluoromethyl, benzyl, carboxyethyl, ethoxycarbonylmethyl, and acetylaminomethyl, provided that the substituted alkyl group includes an unsaturated hydrocarbon group having 2 to 18 carbon atoms, preferably 3 to 10 carbon atom, more preferably 3 to 5 carbon atoms (for example, vinyl, ethynyl, 1-cyclohexenyl, benzylidyne, and benzylidene)), a substituted or unsubstituted aryl group having 6 to 20 carbon atoms, preferably 6 to 15 carbon atoms, more preferably 6 to 10 carbon atoms, (for example, phenyl, naphthyl, p-carboxyphenyl, p-nitrophenyl, 3,5-dichlorophenyl, p-cyanophenyl, m-fluorophenyl, p-tolyl, 4-propylcyclohexyl-4'-biphenyl, 4-butylcyclohexyl-4'-biphenyl, 4-pentylcyclohexyl-4'-biphenyl, and 4-propylphenyl-2-ethynyl-4'-biphenyl), a substituted or unsubstituted heteroaryl group having 1 to 20 carbon atoms, preferably 2 to 10 carbon atoms, more preferably 4 to 6 carbon atoms (for example, pyridyl, 5-methylpyridyl, thienyl, furyl, morpholino, and tetrahydrofurfuryl).

Those substituent groups V may have a structure in which a benzene ring or a naphthalene ring is condensed. Further, the substituent illustrated by the explanation for V explained so far may further be substituted on the substituents described above.

Among the substituent groups V, a preferred substituent as a substituent for a bivalent arylene group, a bivalent heteroarylene group and a bivalent alicyclic hydrocarbon group represented by $D^1$ and $D^2$ include an alkyl group, an alkoxy group, a halogen atom, a hydroxy group, and a cyano group, and further preferably an alkyl group, a halogen atom, and a cyano group.

In the Formula (4), $L^1$ represents a bivalent linking group, preferably an alkenylene group, an alkynylene group, an ether group, an ester group, a carbonyl group, an azo group, an azoxy group, and an alkyleneoxy group, and more preferably an ester group and an alkyleneoxy group.

The alkenylene group represented by $L^1$ includes an alkenylene group having preferably 2 to 20 carbon atoms, more preferably 2 to 10 carbon atoms and includes, for example, an ethenylene group.

The alkynylene group represented by $L^1$ includes an alkynylene group having, preferably 2 to 20 carbon atoms, more preferably 2 to 10 carbon atoms, and includes, for example, an ethynylene group.

In the Formula (4), $T^1$ and $T^2$ each independently represents an alkyl group, an alkoxy group, an alkoxycarbonyl group, an acyl group, an acyloxy group, a halogen atom, and a cyano group.

$T^1$ and $T^2$ each represents preferably an alkyl group having 1 to 30 carbon atoms, more preferably 4 to 20 carbon atoms, further preferably 6 to 18 carbon atoms; an alkoxy group having 1 to 30 carbon atoms, more preferably 4 to 20 carbon atoms, further preferably 6 to 18 carbon atoms; an alkoxycarbonyl group having 2 to 30 carbon atoms, more preferably, 5 to 21 carbon atoms, further preferably 7 to 19 carbon atoms, an acyl group having 2 to 30 carbon atoms, more preferably 5 to 21 carbon atoms, further preferably 7 to 19 carbon atoms; an acyloxy group having 2 to 30 carbon atoms, more preferably 5 to 21 carbon atoms, further preferably 7 to 19 carbon atoms; a halogen atom, and a cyano group.

The alkyl group, alkoxy group, alkoxycarbonyl group, acyl group, and acyloxy group represented by $T^1$ and $T^2$ in the Formula (4) may have or may not have a substituent, and the substituent includes the substituent groups V.

The substituent for the alkyl group, alkoxy group, alkoxycarbonyl group, acyl group and acyloxy group represented by $T^1$ and $T^2$ is preferably a halogen atom (particularly, a chlorine atom and fluorine atom), a cyano group, a hydroxy group, an alkoxy group, and an acyl group, among the substituent group V.

In the Formula (4), specific examples of the alkyl groups each represented by $T^1$ and $T^2$ include, for example, octyl, nonyl, decyl, undecyl, dodecyl, octadecyl, 4-cyanobutyl, trifluoromethyl, and 3-methoxypropyl.

Specific examples of the alkoxy groups each represented by $T^1$ and $T^2$ include, for example, octyloxy, undecyloxy, dodecyloxy, trifluoromethoxy and 2-methoxyethoxy group.

Specific examples of the alkoxycarbonyl groups each represented by $T^1$ and $T^2$ include, for example, octyloxycarbonyl and dodecyloxycarbonyl.

Specific examples of the acyl groups each represented by $T^1$ and $T^2$ include, for example, octylcarbonyl and dodecylcarbonyl.

Specific examples of the acyloxy groups each represented by $T^1$ and $T^2$ include, for example, octylcarbonyloxy and dodecylcarbonyloxy.

In the Formula (4), $T^1$ and $T^2$ are particularly preferably an alkyl group, an alkoxy group, halogen atom, and a cyano group.

In the Formula (4), e represents an integer of 1 to 3, preferably 1 or 2. When e represents 2 or 3, a plurality of $D^1$ may be identical or different from each other.

In the Formula (4), m represents an integer of 1 to 3, preferably 1 or 2. When m represents 2 or 3, a plurality of $D^1$ may be identical or different from each other, and a plurality of $L^1$ may be identical or different from each other.

In the Formula (4), k represents 1 or 2. When k represents 2, a plurality of $D^2$ may be identical or different from each other.

In the Formula (4), the total number of the groups represented by $D^1$ and $D^2$, that is, e×m+k is an integer of 3 to 5, more preferably an integer of 3 or 4. In a case where e and k each represents 2 or more, two or more $D^1$ and $D^2$ may be identical or different with each other, and in a case where m is 2 or more, two or more of $((D^1)_e-L^1)$ may be identical or different with each other.

Especially preferred combinations of e, m and k are described below.
(i) e=1, m=2, and k=1,
(ii) e=2, m=1, k=1, and
(iii) e=2, m=1 and k=2.

Specific examples of a smectic liquid crystal usable in the present invention are shown below, but, the present invention is no way limited thereto.

(edited by Japan Society for the Promotion of Science, 142th Committee, published from Nikkan Kogyo Shinbunsha, 1989) can be used.

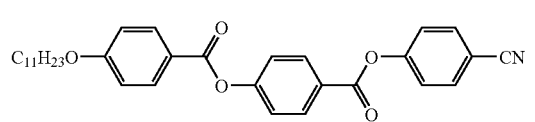

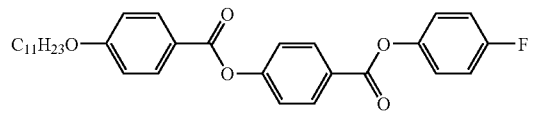

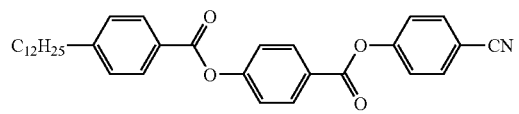

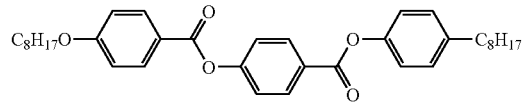

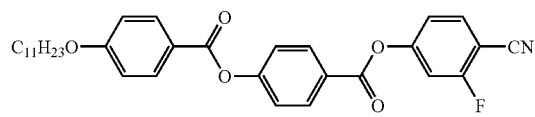

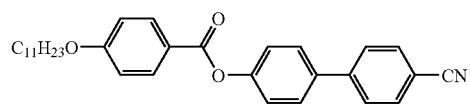

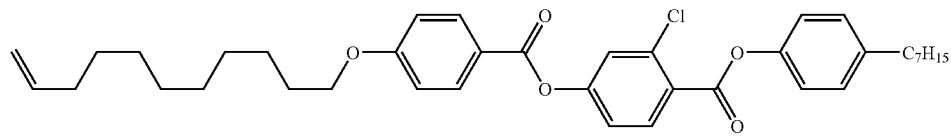

4) Other Liquid Crystals

The smectic liquid crystal composition of the present invention may contain a nematic liquid crystal compound in which the sign of the an anisotropicity of the dielectric constant thereof is not reversed between a low frequency region and a high frequency region of an applied electric field. Specific examples of such nematic liquid crystal compound include azomethine compound, cyanobiphenyl compound, cyanophenyl ester, fluoro-substituted phenyl ester, phenyl cyclohexane carboxylate, fluoro-substituted phenyl cyclohexane carboxylate, cyanophenylcyclohexane, fluoro-substituted phenylcyclohexane, cyano-substituted phenylpyrimidine, fluoro-substituted phenylpyrimidine, alkoxy-substituted phenylpyrimidine, fluoro-substituted alkoxy-substituted phenyl pyrimidine, phenyldioxane, tolane compound, fluoro-substituted tolane compound, and alkenylcyclohexyl benzonitrile.

Further, liquid crystal compounds described in "Liquid Crystal Device Handbook" pp 154 to 192, and pp 715 to 722

Further, host liquid crystals substituted with fluorine, which are suitable to TFT addressing, can also be used. They include, for example, liquid crystals of Merck Ltd. (ZLI-4692, MLC-6267, 6284, 6287, 6288, 6406, 6422, 6423, 6425, 6435, 6437, 7700, 7800, 9000, 9100, 9200, 9300, 10000, etc.) and liquid crystals of Chisso Corp. (LIXON 5036xx, 5037xx, 5039xx, 5040xx, 5041xx, etc.).

2-2 Dichroic Dye

The dual frequency addressable smectic liquid crystal composition of the present invention preferably contains a dichroic dye. The dichroic dye is defined as a compound which is dissolved in a host liquid crystal and has a function of absorbing light. While the absorption maximum and the absorbing band of the dichroic dye are not particularly restricted, it is preferred that the dye has an absorption maximum in a yellow region (Y), a magenta region (M) or a cyan region (C).

Further, as shown in the displaying method described above, it is also preferred to conduct full color display using dichroic dyes showing absorption in green, red, and blue regions and juxtaposing dual frequency addressable smectic liquid crystal compositions containing them.

The dichotic dye to be used for each of smectic liquid crystal compositions may be used alone or may be used as a mixture of plurality of them. In a case of mixing a plurality of dyes, dyes having the same species of chromophoric group may be mixed, dichromatic dyes having chromophoric groups which are different from each other may be mixed, and a mixture of dichroic dyes having absorption maximums in Y, M and C is preferably used.

Well known dichoric dyes include, for example, those described in "Diachronic Dyes for Liquid Crystal Display", written by A. V. Ivashchenko, 1994, published from CRC Corp. A method of conducting full color display by mixing a yellow dye, a magenta dye, and a cyan dye is described in details in "Color Chemistry", (written by Sumio Tokida, 1982, published from Maruzen). The yellow region herein is a range of 430 to 490 nm, the magenta region is a range of 500 to 580 nm, and the cyan region is a range of 600 to 700 nm.

Next, the chromophoric group used in the dichroic dye of the present invention will be explained.

Any chromophoric group of the dichroic dye may be used, including, for example, azo dyes, anthraquinone dyes, perylene dyes, merocyanine dyes, azomethine dyes, phthaloperylene dyes, indigo dyes, azulene dyes, dioxadine dyes, polythiophene dyes, and phenoxadine dyes. Preferred are azo dyes, anthraquinone dies, phenoxazine dyes, and particularly preferred are anthraquinone dyes, or phenoxazone dyes (phenoxazine-3-one).

The azo dyes may be any of monoazo dyes, bisazo dyes, trisazo dyes, tetrakisazo dyes, and pentakisazo dyes, and preferred are monoazo dyes, bisazo dyes, trisazo dyes and the like.

The cyclic structure contained in the azo dye may be heterocyclic rings (quinone ring, pyridine ring, thiazole ring, benzothiazole ring, oxazole ring, benzooxazole ring, imidazole ring, benzoimidazole ring, pyrimidine ring, etc.) in addition to aromatic groups (benzene ring, naphthalene ring, etc.).

The substituent for the anthraquinone dye is preferably those containing an oxygen atom, sulfur atom, or nitrogen atom and includes, for example, a alkoxy group, an aryloxy group, an alkylthio group, an arylthio group, an alkylamino group, and an arylamino group. The number of substitution of the substituent may be of any number and di-substitution, tri-substitution, or tetrakis-substitution is preferred, and di-substitution and tri-substitution are particularly preferred. The substitution of the substituent may be at any position and preferred structure is 1,4-di-substitution, 1,5-di-substitution, 1,4,5-tri-substitution, 1,2,4-tri-substitution, 1,2,5-tri-substituion, 1,2,4,5-tetra-substitution, and 1,2,5,6-tetra-substitution.

The substituent for the phenoxazone dye (phenaxazin-3-on) is preferably those containing an oxygen atom, sulfur atom, or nitrogen atom and includes, for example, an alkoxy group, an aryloxy group, an alkylthio group, an arylthio group, an alkylamino group, and an arylamino group.

The dichroic dye according to the present invention preferably has the substituent represented by the following Formula (1). Formula (1):

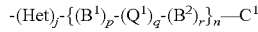

In the Formula (1), Het represents oxygen atom or sulfur atom, and particularly preferably sulfur atom.

In the Formula (1), $B^1$ and $B^2$ each represents independently an arylene group, a hetero-arylene group, or a bivalent cycloaliphatic hydrocarbon group each of which may or may not have a substituent.

The arylene group represented by $B^1$ and $B^2$ is preferably an arylene group having 6 to 20 carbon atoms, more preferably 6 to 10 carbon atoms. Specific examples of preferred arylene group include, for example, phenylene group, naphthalene group, and anthracene group, particularly preferably a substituted phenylen group, and further preferably 1,4-phenylene group.

The heteroarylene group represented by $B^1$ and $B^2$ is preferably an heteroarylene group having 1 to 20 carbon atoms, and more preferably an heteroarylene group having 2 to 9 carbon atoms. Specific examples of preferred heteroarylene group include, for example, a group comprising pyridine ring, quinoline ring, isoquinoline ring, py dine ring, pyrazine ring, thiophene ring, furan ring, oxazole ring, thiazole ring, imidazole ring, pyrazole ring, oxadiazole ring, thiadiazole ring, and triazole ring, as well as a heteroarylene group obtained by eliminating hydrogen atoms each by one from two carbon atoms in a condensed ring formed by ring condensation thereof.

The bivalent cycloaliphatic hydrocarbon group represented by $B^1$ and $B^2$ is preferably a bivalent cycloaliphatic hydrocarbon group having, preferably 3 to 20 carbon atoms, more preferably 4 to 10 carbon atoms. Specific examples of preferred bivalent cycloaliphatic hydrocarbon group include a cyclohexanediyl and cyclopentanediyl, more preferably cyclohexane-1,2-diyl, cyclohexane-1,3-diyl, cyclohexane-1,4-diyl, and cyclopentane-1,3-diyl, particularly preferably (E)-cyclohexane-1,4-diyl.

The bivalent arylene group, the bivalent heteroarylene group, and the bivalent cycloaliphatic hydrocarbon group represented by $B^1$ and $B^2$ may further have a substituent and the substituent includes the substituent group V described previously.

Among the substituent groups V, preferred substituent for the bivalent arylene group, bivalent heteroarylene group, and bivalent cyclic hydrocarbon group are the above mentioned alkyl group, aryl group, alkoxy group, aryloxy group, halogen atom, amino group, substituted amino group, hydroxy group, alkylthio group, and arylthio group, and more preferably the alkyl group, aryl group, and halogen atom.

$Q^1$ in the Formula (1) represents a bivalent linking group, which is a linking group having an atomic group comprising at least one atom selected from carbon atom, nitrogen atom, sulfur atom, and oxygen atom.

The bivalent linking group represented by $Q^1$ is a bivalent linking group having preferably 0 to 60 carbon atoms, more preferably 0 to 30 carbon atoms, and further preferably 0 to 20 carbon atoms.

Further, the bivalent linking group represented by $Q^1$ preferably includes bivalent linking groups comprising an alkylene group, an alkenylene group, an alkynilene group, an amide group, an ether group, an ester group, a sulfoneamide group, an ureido group, a sulfonyl group, a sulfinyl group, a thioether group, a carbonyl group, an —NR— group (in which R represents hydrogen atom, an alkyl group or an aryl group), an azo group, an azoxy group, a heterocyclic bivalent group each by one or as a combination of two or more of them.

The alkylene group represented by $Q^1$ is an alkylene group having preferably 1 to 20 carbon atoms, more preferably 1 to 10 carbon atoms, and includes, for example, a methylene group, an ethylene group, a propylene group, a butylenes group, a pentylene group, and a cyclohexyl-1,4-diyl group.

The alkenylene group represented by $Q^1$ is preferably an alkenylene group having preferably 2 to 20 carbon atoms, more preferably 2 to 10 carbon atoms, and includes, for example, an ethenylene group.

The alkynylene group represented by $Q^1$ is an alkynylene group having, preferably 2 to 20 carbon atoms, more preferably 2 to 10 carbon atoms, and includes, for example, an ethynylene group.

The alkyl group represented by R in the —NR— group is an alkyl group having preferably 1 to 20 carbon atom, more preferably 1 to 10 carbon atoms, and the aryl group represented by R is an aryl group having, preferably 6 to 14 carbon atoms, more preferably 6 to 10 carbon atoms.

The heterocyclic ring represented by $Q^1$ is a heterocyclic ring of, preferably 2 to 20 carbon atoms, more preferably 4 to 10 carbon atoms, and includes, for example, a piperazine-1,4-diyl group.

The bivalent linking group represented by $Q^1$ is preferably an alkylene group, an alkenylene group, an alkynylene group, an ether group, a thioether group, an amido group, an ester group, a carbonyl group, and their combinations.

The bivalent linking group represented by $Q^1$ is particularly preferably an alkylene group, an alkynylene group, an ether group, an amido group, an ester group, and a carbonyl group.

$C^1$ in the Formula (1) represents an alkyl group, a cycloalkyl group, an alkoxy group, an alkoxycarbonyl group, an acyl group, and an acyloxy group.

$C^1$ is preferably an alkyl group or a cycloalkyl group having 1 to 30 carbon atoms, preferably 1 to 12 carbon atoms, more preferably from 1 to 8 carbon atoms, an alkoxy group having 1 to 20 carbon atoms, preferably 1 to 10 carbon atoms, more preferably 1 to 8 carbon atoms, an acyloxy group having 1 to 20 carbon atoms, preferably 2 to 12 carbon atoms, more preferably 2 to 8 carbon atoms, an acyl group having 1 to 30 carbon atoms, preferably 1 to 12 carbon atoms, more preferably 1 to 8 carbon atoms, and an alkoxycarbonyl group having 2 to 20 carbon atoms, preferably 2 to 12 carbon atoms, more preferably 2 to 8 carbon atoms.

The alkyl group, cycloalkyl group, alkoxy group, alkoxycarbonyl group, acyl group and acyloxy group may have or may not have a substituent, and the substituent includes, for example, the substituent group V described above.

A substituent for the alkyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the cycloalkyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, an aryloxycarbonyl group, and an alkyl group.

A substituent for the alkoxy group represented by $C^1$ preferably includes, among the substituent group V, a halogen atom (particularly, fluorine atom), a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the alkoxycarbonyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the acyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group and an aryloxycarbonyl group.

A substituent for the acyloxy group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, or an aryloxycarbonyl group.

Specific examples of the alkyl group and the cycloalkyl group represented by $C^1$ include, for example, methyl, ethyl, propyl, butyl, t-butyl, i-butyl, s-butyl, pentyl, t-pentyl, hexyl, heptyl, octyl, cyclohexyl, 4-methylcyclohexyl, 4-ethylcyclohexyl, 4-propylcyclohexyl, 4-butylcyclohexyl, 4-pentylcyclohexyl, hydroxymethyl, trifluoromethyl or benzyl.

Specific examples of the alkoxy group represented by $C^1$ include, for example, a methoxy group, an ethoxy group, a 2-methoxyethoxy group, or a 2-phenylethoxy group.

Specific examples of the acyloxy group represented by $C^1$ include, for example, an acetyloxy group, or a benzoyloxy group.

Specific examples of the acyl group represented by $C^1$ include, for example, acetyl, formyl, pivaloyl, 2-chloroacetyl, stearoyl, benzoyl, or p-n-octyloxyphenylcarbonyl.

Specific examples of the alkoxycarbonyl group represented by $C^1$ include, for example, methoxycarbonyl, ethoxycarbonyl, or 2-benzyloxycarbonyl.

$C^1$ represents particularly preferably an alkyl group or an alkoxy group, and more preferably ethyl, propyl, butyl, pentyl, hexyl, or trifluoromethoxy.

j represents 0 or 1, and preferably 0.

p, q and r each independently represents an integer of from 0 to 5, and n represents an integer of from 1 to 3. The total number of the groups represented by $B^1$ and $B^2$, that is, $(p+r) \times n$ is an integer of from 3 to 10, more preferably an integer of from 3 to 5. In a case where p, q, or r is 2 or greater, two or more $B^1$, $Q^1$ and B may be identical or different with each other respectively, and in a case where n is 2 or greater, $\{(B^1)_p\text{-}(Q^1)_q\text{-}(B^2)_r\}$ may be identical or different with each other.

Preferable combinations of p, q, r, and n are to be described below.

(i) p=3, q=0, r=0, n=1
(ii) p=4, q=0, r=0, n=1
(iii) p=5, q=0, r=0, n=1
(iv) p=2, q=0, r=1, n=1
(v) p=2, q=1, r=1, n=1
(vi) p=1, q=1, r=2, n=1
(vii) p=3, q=1, r=1, n=1
(viii) p=2, q=0, r=2, n=1
(ix) p=1, q=1, r=1, n=2
(x) p=2, q=1, r=1, n=2

An particularly preferred combinations are: (i) p=3, q=0, r=0, n=1, (iv) p=2, q=0, r=1, n=1, or (v) p=2, q=1, r=1, n=1.

Further, the —$\{(B^1)_p\text{-}(Q^1)_q\text{-}(B^2)_r\}_n$—$C^1$ preferably contains a structure showing liquid crystallinity. While the liquid crystal referred to herein may be in any phase, it is preferably nematic liquid crystal, smectic liquid crystal, discotic liquid crystal, and particularly preferably nematic crystal or smectic liquid crystal.

Specific examples of the —{($B^1$)$_p$-($Q^1$)$_q$-($B^2$)$_r$}$_n$—$C^1$ are shown below, but the present invention is no way limited to the examples (in the following chemical formulae, the wave line represents a connection position).

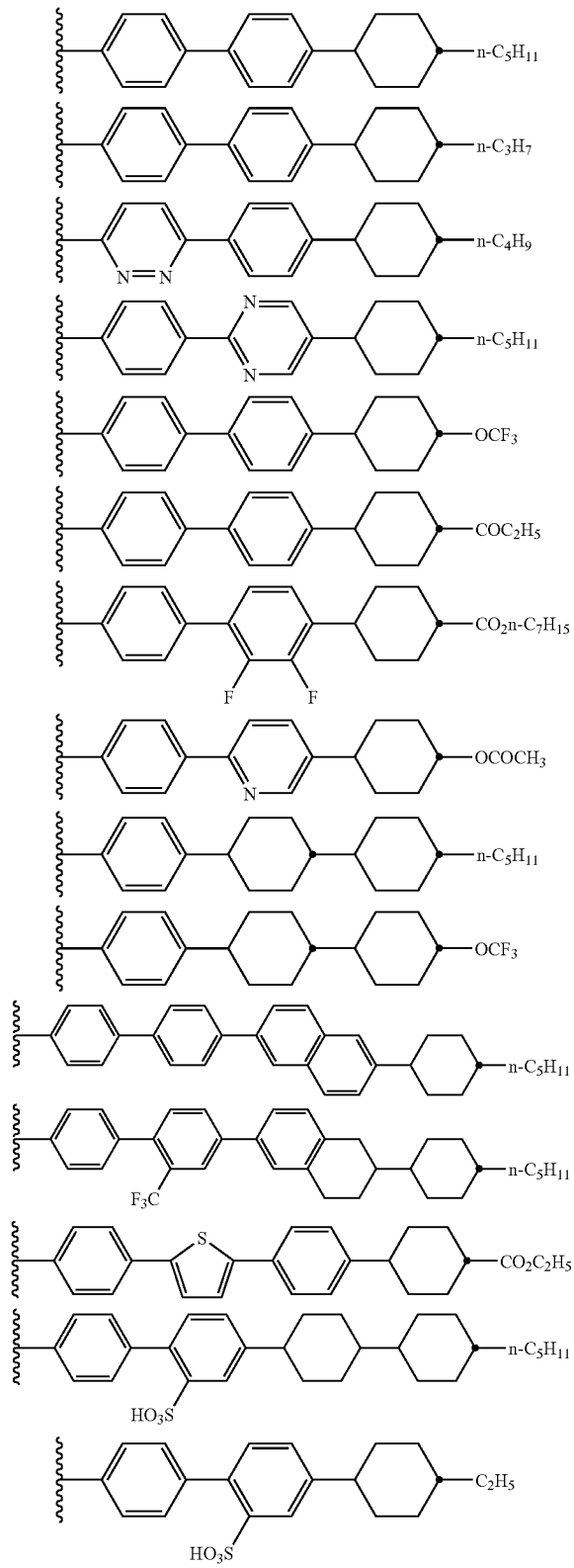

The dichroic dye used in the present invention has preferably one or more, more preferably 1 to 8, further preferably 1 to 4, and particularly preferably 1 to 2 substituents represented by —{($B^1$)$_p$-($Q^1$)$_q$-($B^2$)$_r$}$_n$—$C^1$.

A preferred structure of the substituent represented by the Formula (1) includes combinations described below.

[1] A structure in which Het represents sulfur atom, $B^1$ represents an aryl group or a heteroaryl group, $B^2$ represents cyclohexane-1,4-diyl group, $C^1$ represents an alkyl group, and j=1, p=2, q=0, r=1, and n=1.

[2] A structure in which Het represents sulfur atom, $B^1$ represents an aryl group or a heteroaryl group, B represents cyclohexane-1,4-diyl group, $C^1$ represents an alkyl group, and j=1, p=1, q=0, r=2 and n=1.

Especially preferred structures are:

[1] a structure represented by the following Formula (a-1), in which Het represents sulfur atom, $B^1$ represents a 1,4-phenylene group, $B^2$ represents trans-cyclohexyl group, $C^1$ represents an alkyl group (preferably, methyl, ethyl, propyl, butyl, pentyl, or hexyl), and j=1, p=2, q=0, r=1 and n=1, and

[2] a structure represented by the following Formula (a-2), in which Het represents a sulfur atom, $B^1$ represents 1,4-phenylene, B represents trans-cylohexane-1,4-diyl, $C^1$ represents an alkyl group (preferably, methyl, ethyl, propyl, butyl, pentyl, or hexyl), and j=1, p=1, q=0, r=2 and n=1.

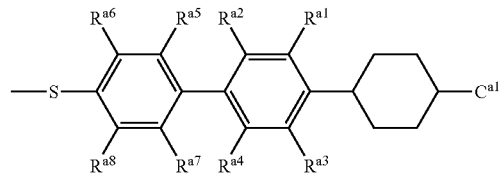

Formula (a-1)

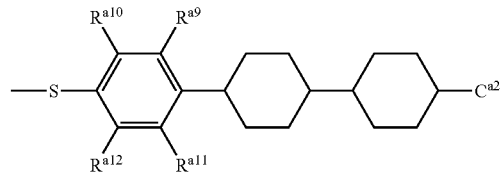

Formula (a-1)

In the Formulae (a-1) and (a-2), $R^{a1}$ to $R^{a12}$ each independently represents a hydrogen atom or a substituent. The substituent includes, for example, a substituent selected from the substituent group V. $R^{a1}$ to $R^{a12}$ each independently represents preferably hydrogen atom, a halogen atom (particularly, fluorine atom), an alkyl group, an aryl group, and an alkoxy group. Among the alkyl group, aryl group, and alkoxy group represented by $R^{a1}$ to $R^{a12}$, preferred are those identical with the alkyl group, aryl group, and alkoxy group described for the substituent group V.

In the Formulae (a-1) and (a-2), $C^{a1}$ and $C^{a2}$ each independently represents an alkyl group, and an alkyl group having preferably 1 to 20 carbon atoms, more preferably 1 to 10 carbon atoms, and particularly preferably methyl, ethyl, propyl, butyl, pentyl, or hexyl.

The azo dye may be any of monoazo dye, bisazo dye, trisazo dye, tetrakisazo dye, or pentakisazo dye, and preferably a monoazo dye, bisazo dye and trisazo dye.

A ring structure contained in the azo dye includes, in addition to aromatic groups (benzene ring, naphthalene ring, etc.), hetero rings (quinoline ring, pyridine ring, thiazole ring, benzothiazole ring, oxazole ring, benzooxazole ring, imidazole ring, benzoimidazole ring, pyrimidine ring, etc.).

The substituent for the anthraquione dye preferably includes those containing an oxygen atom, sulfur atom or nitrogen atom, for example, an alkoxy group, an aryloxy group, an alkylthio group, an arylthio group, an alkylamino group, and an arylamino group.

While the number of substitution for the substituent may be of any number, and di-substitution, tri-substitution, and tetra-substitution are preferred, and di-substitution, tri-substitution are particularly preferred. The substitution of the substituent may be at any position adopted, but preferred are 1,4-di-substitution, 1,5-di-substitution, 1,4,5-tri-substitution, 1,2,4-tri-substitution, 1,2,5-tri-substitution, 1,2,4,5-tetra-substitution, and 1,2,5,6-tetra-substitution structure.

The anthraquinone dye is more preferably a compound represented by the following Formula (2).

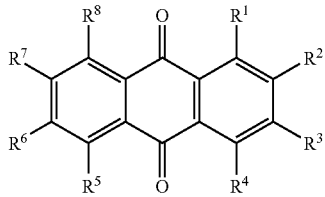

Formula (2)

In the Formula (2), at least one of $R^1$, $R^2$, $R^3$, $R^4$, R, $R^6$, $R^7$ and $R^8$ represents $-(Het)_j-\{(B^1)_p-(Q^1)_q-(B^2)_r\}_n-C^1$, and others each independently represents a hydrogen atom or a substituent.

In the $-(Het)_j-\{(B^1)_p-(Q^1)_q-(B^2)_r\}_n-C^1$, Het represents an oxygen atom or a sulfur atom, $B^1$ and $B^2$ each independently represents an arylene group, a heteroarylene group, or a bivalent alicyclic hydrocarbon group, $Q^1$ represents a bivalent linking group, $C^1$ represents an alkyl group, a cycloalkyl group, an alkoxy group, an alkoxycarbonyl group, an acyl group, or an acyloxy group, j represents 0 or 1, p, q and r each independently represents an integer of 0 to 5, and n represents an integer of 1 to 3. The total number of the groups represented by $B^1$ and $B^2$, that is, $(p+r) \times n$ is an integer of 3 to 10, preferably an integer of 3 to 5; when p is 2 or larger, two or more groups represented by $B^1$ may be the same or different; when q is 2 or larger, two or more groups represented by Q, may be the same or different; when r is 2 or larger, two or more groups represented by $B^2$ may be the same or different; and when n is 2 or larger, two or more groups represented by $\{(B^1)_p-(Q^1)_q-(B^2)_r\}$ may be the same or different.

A preferred range for Het, $B^1$, $B^2$, $Q^1$, $C^1$, j, p, q, r and n herein is the same as the preferred range for Het, $B^1$, $B^2$, $Q^1$, $C^1$, j, p, q, r and n as described for the Formula (1) respectively.

The substituent in the Formula (2) is, for example, the substituent group V, and preferably includes a halogen atom, a mercapto group, a hydroxy group, a carbamoyl group, a sulfamoyl group, a nitro group, an alkoxy group, an aryloxy group, an acyloxy group, an acylamino group, an amino group, an alkylthio group, an arylthio group, a heteroarylthio group, an alkoxycarbonyl group, an aryloxycarbonyl group, an alkyl group, an aryl group, and a heteroaryl group, and more preferably a halogen atom, a hydroxy group, a nitro group, an alkoxy group, an aryloxy group, an acyloxy group, an amino group, an alkylthio group, an arylthio group, a heteroarylthio group, an alkoxycarbonyl group, an aryloxycarbonyl group, an alkyl group, an aryl group, and a heteroaryl group.

Further, it is more preferred, at least one of $R^1$, $R^4$, $R^5$ and $R^8$ represents $-(Het)_j-\{(B^1)_p-(Q^1)_q-(B^2)_r\}_n-C^1$ in the Formula (2)

The substituent for the phenoxazone dye (phenoxazine-3-one) is preferably those containing oxygen atom, sulfur atom, or nitrogen atom, and preferred examples include an alkoxy group, an aryloxy group, an alkylthio group, an arylthio group, an alkylamino group, and an arylamino group.

The phenoxazone dye is more preferably a compound represented by the following Formula (3).

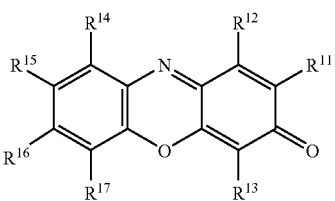

Formula (3)

In the Formula (3), at least one or more of $R^{11}$, $R^{12}$, $R^{13}$, $R^{14}$, $R^{15}$, $R^{16}$, and $R^{17}$ represent $-(Het)_j-\{(B^1)_p-(Q^1)_q-(B^2)_r\}_n-C^1$, and others represent hydrogen atom or a substituent, respectively.

In the $-(Het)_j-\{(B^1)_p-(Q^1)_q-(B^2)_r\}_n-C^1$, Het represents oxygen atom or sulfur atom, $B^1$ and $B^2$ each independently represents an arylene group, a heteroarylene group or a bivalent alicyclic hydrocarbon group, $Q^1$ represents a bivalent linking group, $C^1$ represents an alkyl group, a cycloalkyl group, an alkoxy group, an alkoxycarbonyl group, an acyl group, and an acyloxy group, j represents 0 or 1, p, q, and r each independently represents an integer of from 0 to 5, n represents an integer of from 1 to 3. The total number of the groups represented by $B^1$ and $B^2$, that is, $(p+r) \times n$ is an integer of 3 to 10; preferably an integer of 3 to 5, when p is 2 or larger, two or more groups represented by B, may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p-(Q^1)_q-(B^2)_r\}$ may be the same or different.

The preferred ranges for Het, $B^1$, $B^2$, $Q^1$, $C^1$, j, p, q, r and n in this case are the same as the preferred ranges for Het, $B^1$, $B^2$, $Q^1$, $C^1$, j, p, q, r, and n as described for the Formula (1) respectively.

The substituent in the Formula (3) is, for example, the substituent group V, and includes preferably an amino group, a halogen atom, a hydroxy group, an cyano group, an carbamoyl group, a sulfamoyl group, an alkoxy group, an aryloxy group, an acyloxy group, an acylamino group, an ureido group, an imido group, an alkylthio group, an arylthio group, a heteroarylthio group, an alkoxycarbonyl group, an aryloxycarbonyl group, an alkyl group, an aryl group, a heteroaryl group, and more preferably an amino group, a halogen atom, a hydroxy group, a carbamoyl group, an acyloxy group, an acylamino group, an imido group, an alkylthio group, an arylthio group, a heteroarylthio group, an alkoxycarbonyl group, an aryloxycarbonyl group, an alkyl group, and an aryl group.

Further preferably, in the Formula (3), at least one of $R^{11}$, $R^{14}$ and $R^{16}$ represents $-(Het)_j-\{(B^1)_p-(Q^1)_q-(B^2)_r\}_n-C^1$.

Specific examples of the dichroic dyes of anthraquinone dye and/or phenoxazone dye usable in the present invention are shown below, but the present invention is no way limited at all by the specific examples below.
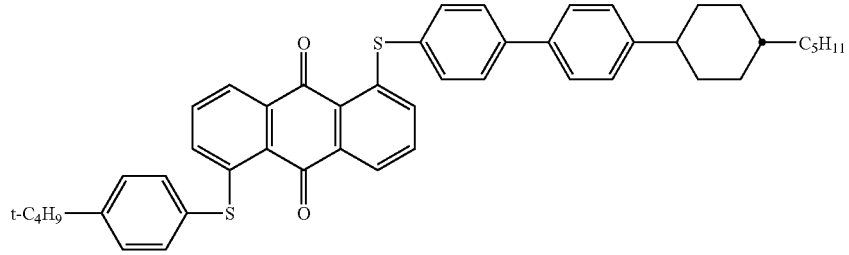
No. 1-1
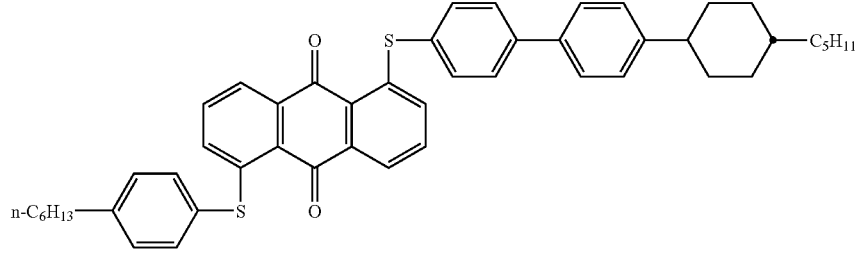
No. 1-2
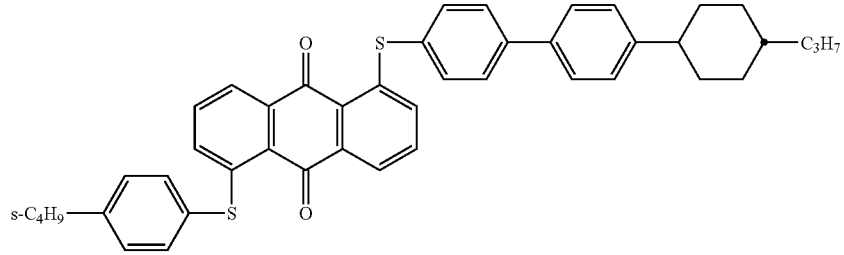
No. 1-3
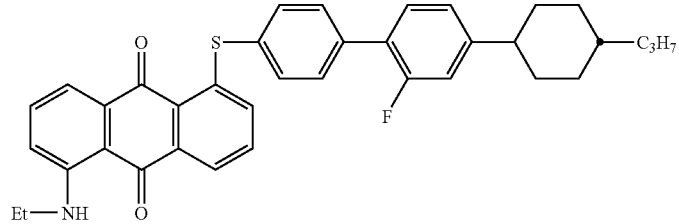
No. 1-4
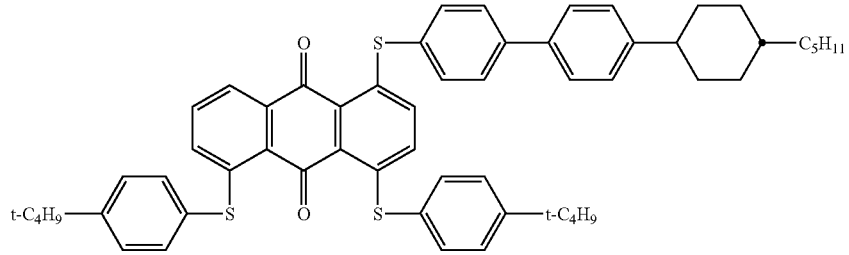
No. 1-5
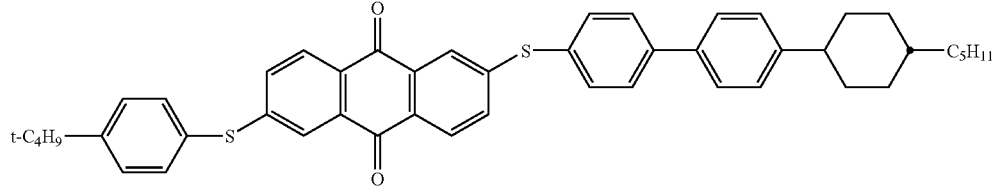
No. 1-6

-continued
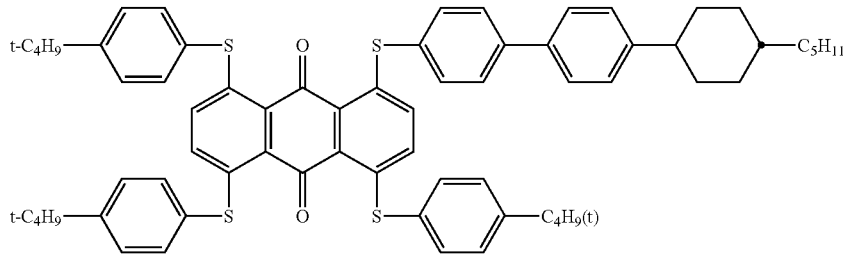
No. 1-7
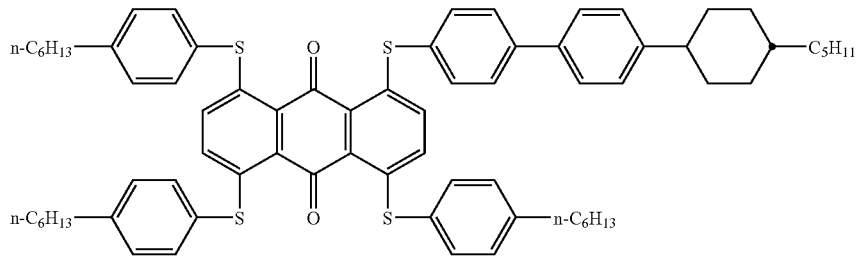
No. 1-8
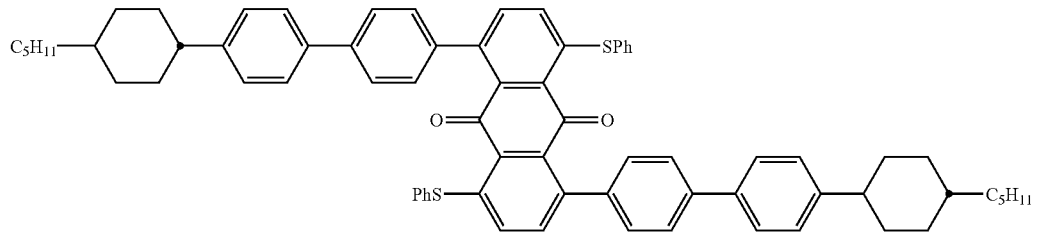
No. 1-9
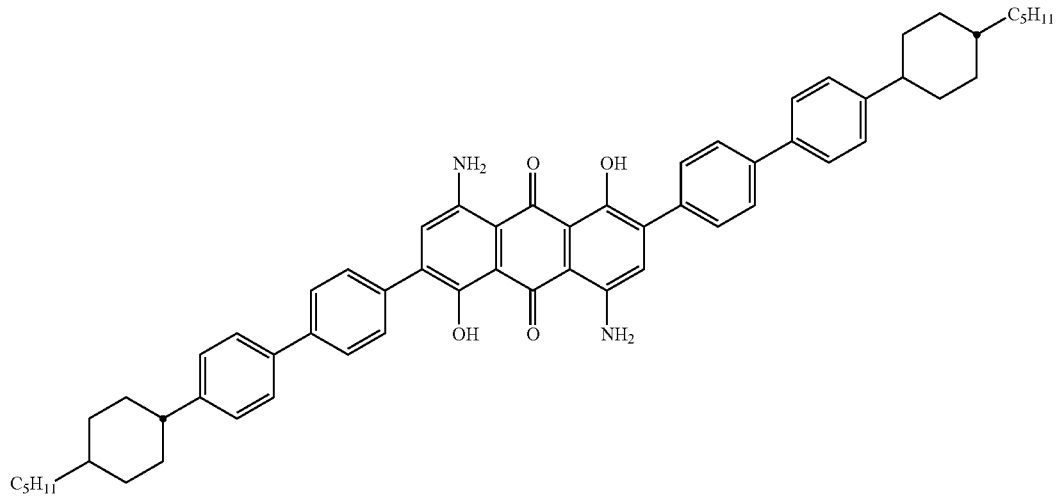
No. 1-10
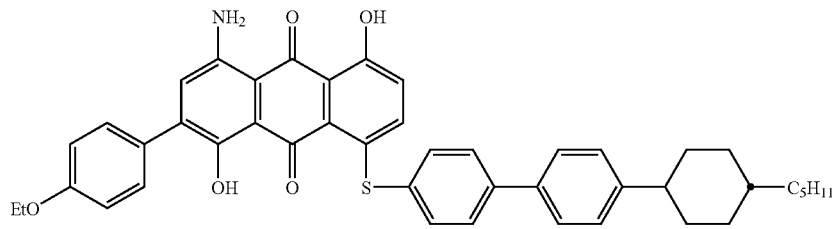
No. 1-11

-continued
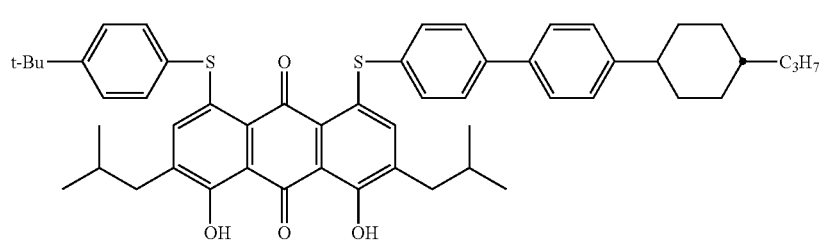
No. 1-12
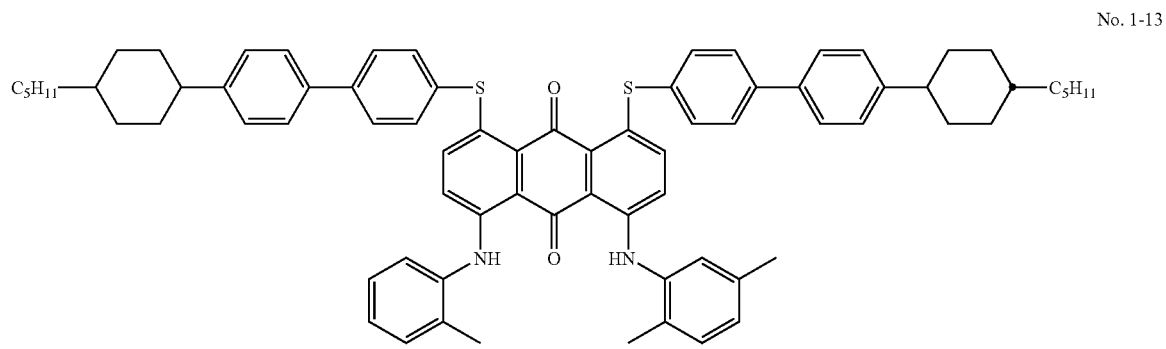
No. 1-13
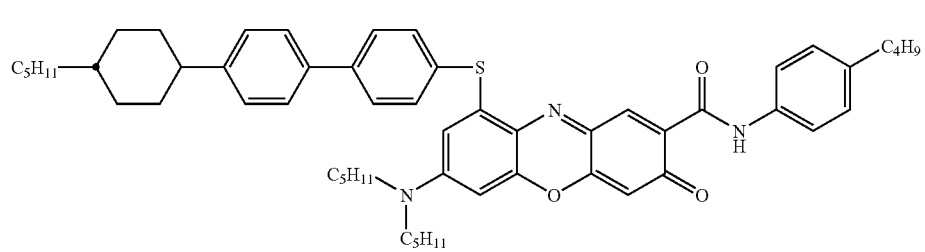
No. 1-14
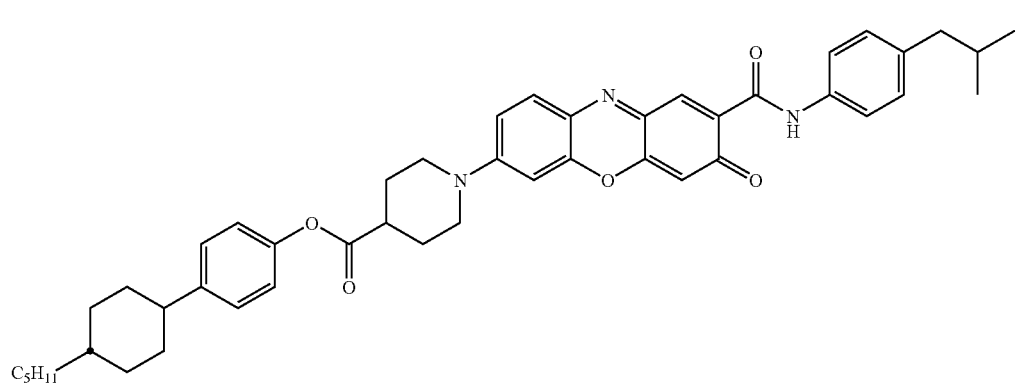
No. 1-15
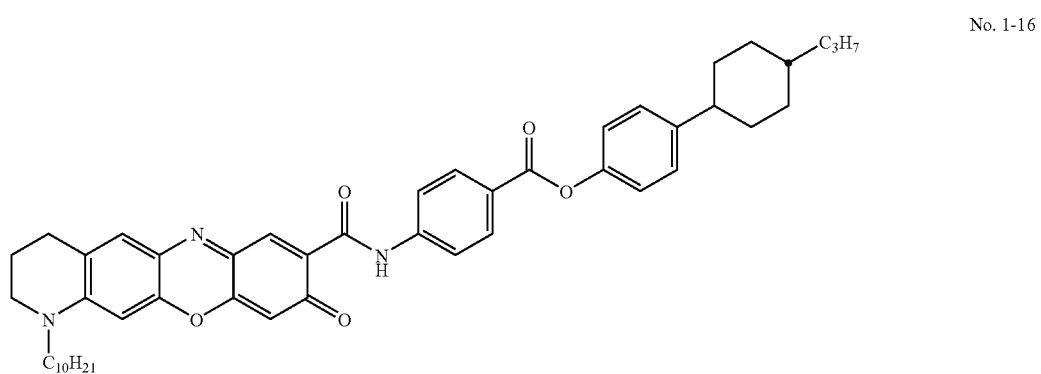
No. 1-16

No. 1-17

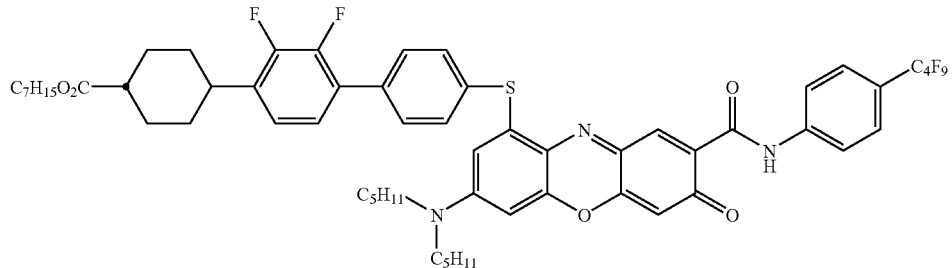

Specific examples of the azo type dichroic dyes usable in the present invention are shown below but the present invention is not restricted to the following specific examples.

No. 2-1

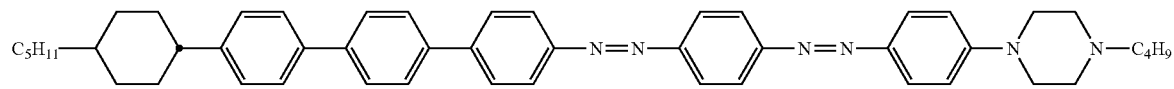

No. 2-2

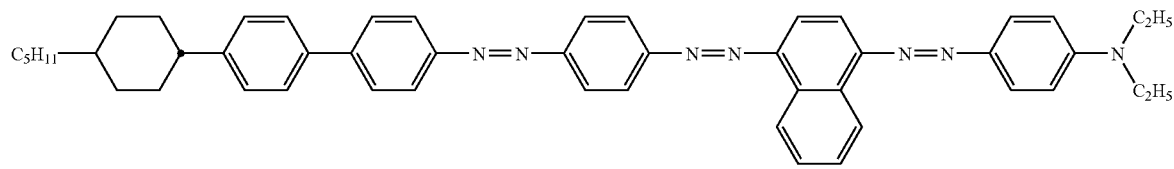

No. 2-3

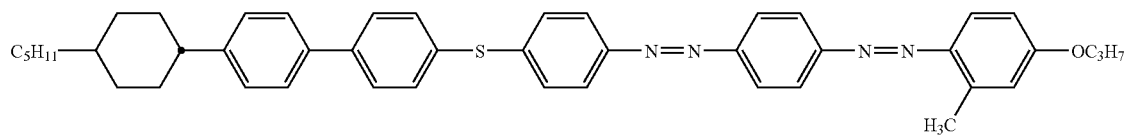

Specific examples of the dioxadine type dichroic dyes and merocyanine type dichroic dyes usable in the present invention are shown below but the present invention is not restricted to the following specific examples.

No. 3-1

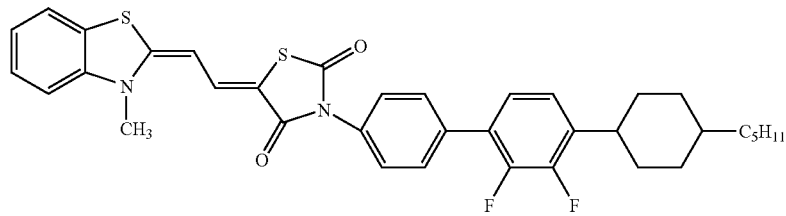

No. 3-2

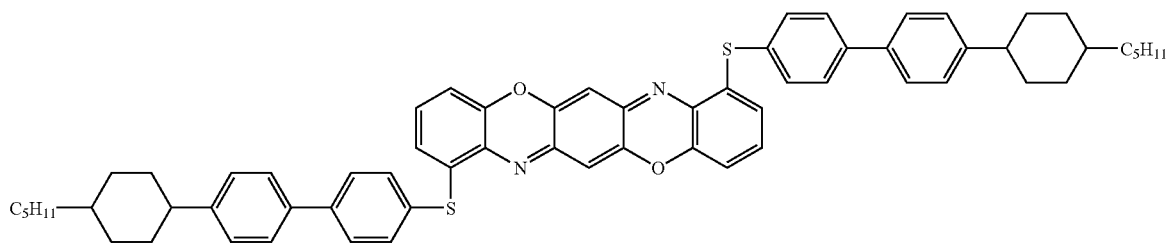

The dichroic dye having the substituent represented by the Formula (1) can be synthesized by combining known methods. They can be synthesized, for example, in accordance with the method described in JP-A No. 2003-192664, The ratio of the dichroic dye to the host liquid crystal in the liquid crystal composition of the present invention may be at any rate, and it is preferably from 0.1 to 15 mass %, and particularly preferably from 0.5 to 6 mass %.

The dichroic dye can be dissolved to the host liquid crystal (mixture of dual frequency addressable nematic crystal and smectic liquid crystal) by utilizing mechanical stirring, heating, supersonic waves, or combination thereof. In addition, for the preparation of the liquid crystal composition of the present invention, known methods can be adopted.

2-3. Other Additives for Liquid Crystal Layer

With an aim of changing the physical property of the host liquid crystal (for example, the temperature range, the dielectric anisotropy, the reflective index anisotropy, or cross-over frequency of the liquid crystal phase), compounds which do not show liquid crystallinity may also be added to the smectic liquid crystal composition of the present invention. The crossover frequency means a frequency at which the sign of the dielectric anisotropy (positive, negative) changes in the dual frequency addressable liquid crystal.

Further, various additives, for example, chiral agents, UV-absorbents, and antioxidants may also be added to the liquid crystal composition of the present invention. The additives include, for example, chiral agents for TN and STN described in "Liquid Crystal Device Handbook" (edited by Japan Society for the Promotion of Science, 142th Committee published from Nikkan Kogyo Shinbunsha, 1989), pp 199-202.

2-4. Layer Constitution of Liquid Crystal Layer

In the liquid crystal layer of the present invention, a plurality of dichroic dyes may also be mixed in one liquid crystal composition. Also the liquid crystal composition may be of any color. In a case of preparing a black liquid crystal composition, for example, by using a plurality of dichroic dyes in admixture, it can be utilized as a liquid crystal element for black and white display by voltage application.

Further, a liquid crystal element for color display can also be manufactured by preparing liquid crystal compositions colored to red, green, and blue respectively and side-by-side arranging three types of the compositions on a substrate.

Alternatively, the liquid crystal layer of the present invention may also be in a laminate structure put between one pair of electrodes as described, for example, in JP-A No. 10-90715. As has already been described for the display method of the liquid crystal element of the present invention, in the layers in the direction of lamination, dichroic dyes in a relationship of subtractive mixture or in a complementary relationship are preferably added respectively.

For example, the liquid crystal layer includes a constitution of laminating each of the layers comprising liquid crystal compositions colored to yellow, magenta, and cyan respectively by the number of three; a constitution of laminating a layer comprising liquid crystal compositions colored to yellow, magenta, and cyan and layers comprising liquid crystal compositions colored to blue, green, and red in a complementary relationship therewith and juxtaposed by side by the number of two; and a constitution formed by laminating layers comprising a liquid crystal composition colored black and layers each comprising red, blue and green liquid crystals juxtaposed by the number of two.

Further, the liquid crystal layer of the present invention may also be constituted by microencapsulating a liquid crystal composition as described in JP-A No. 11-24090. The microcapsule has a wall member made of a polymeric resin and a dual frequency addressable smectic liquid composition containing the dichroic dye incorporated in the wall member. Known methods can be properly applied for the method of manufacturing the micro capsule.

Further, the liquid crystal layer of the present invention may comprise polymer-dispersed liquid crystals as described in JP-A Nos. 5-61025, 5-265053, 6-3691, 6-23061, 5-203940, 6-242423, 6-289376, 8-278490, and 9-813147.

The polymer-dispersed liquid crystal is generally classified into a so-called PDLC (polymer dispersed liquid crystal) type in which pores of a polymeric material having closed cells are filled with liquid crystal, and the liquid crystal is in a discontinuous phase, and a so-called PNLC (Polymer Network Liquid Crystal) type in which the open cells of a polymeric material having continuous pores are filled with the liquid crystal and the liquid crystal is in a continuous phase, and any type may be used in the present invention. Known method can be properly applied to the manufacturing method of the polymer-dispersed liquid crystal.

Further, a polymer-dispersed liquid crystal may also be laminated in the present invention.

Since different the dual frequency addressable smectic liquid crystal composition can be incorporated into the microcapsules and the closed cells of the polymer-dispersed liquid crystal, the dual frequency addressable smectic liquid crystal composition contained in each of the microcapsules or closed cells can be addressable each independently.

3. Electrode

The liquid crystal element of the present invention is a liquid crystal element comprising one pair of electrodes of which at least one is a transparent electrode and a liquid crystal layer between the pair of the electrodes, and the liquid crystal layer contains the liquid crystal composition described above.

As the electrode substrate used for the liquid crystal element of the present invention, a glass or plastic substrate is usually used, the plastic substrate being preferred. The material for the plastic substrate used in the present invention includes, for example, acryl resin, polycarbonate resin, and epoxy resin, specifically, triacetyl cellulose (TAC), polyethylene terephthalate (PET), polyethylene naphthalate (PEN), syndiotactic polystyrene (SPC), polyphenylene sulfide (PPS), polycarbonate (PC), polyarylate (PAr), polysulfone (PSF), polyester sulfone (PES), polyether imide (PEI), cyclo-polyolefin, and polyimide (PI), preferably polyethylene terephthalate (PET).

While the thickness of the plastic substrate is not particularly limited, it is preferably from 30 μm to 700 μm, more preferably from 40 μm to 200 μm, and further preferably 50 μm to 150 μm. In any of the cases, haze is preferably 3% or less, more preferably 2% or less, and further preferably 1% or less, and the total transmittance is preferably 70% or more, more preferably 80% or more, and further preferably 90% or more.

In the plastic substrate, improvers for resin such as plasticizers, dyes and pigments, antistatics, UV absorbents, antioxidants, inorganic fine particles, peeling promoters, leveling agents, and lubricants may be added optionally within a range not deteriorating the effect of the present invention.

The plastic substrate may be either light permeable or light impermeable. In a case of using light impermeable support as the support, a white support having light reflectivity can be used. The white support includes plastic substrate with addition of inorganic pigments such as titanium oxide or zinc oxide. In a case where the support constitutes a display surface, it is necessary that the support has permeability to at least a light in a visible region.

The substrate is described specifically, for example, in "Liquid Crystal Device Handbook" edited by Japan Society for the Promotion of Science, the 142th Committee, published from Nikkan Kogyo Shinbunsha, 1989, pp 218 to 231.

On the substrate, an electrode layer, preferably of a transparent electrode, is formed. For the electrode layer, indium oxide, indium thin oxide (ITO), tin oxide, etc. are used. For the transparent electrode, those described, for example, in "Liquid Crystal Device Handbook" edited by Japan Society for the Promotion of Science, the 142th Committee, published from Nikkan Kogyo Shinbunsha, 1989, pp 232 to 239 are used. The transparent electrode can be formed by a sputtering method, sol-gel method or printing method.

4. Other Constitution of Liquid Crystal Element 4-1. Alignment Treated Layer

With an aim of aligning the liquid crystal in the liquid crystal element of the present invention, a layer applied with an alignment treatment may be formed to the surface where the liquid crystal and substrate are in contact with each other. The alignment treatment includes, for example, a method of alignment by coating a quaternary ammonium salt, a method of alignment by coating polyimide and applying a rubbing treatment, a method of alignment by vapor depositing $SiO_x$ in the oblique direction, and further, a method of alignment by photo-irradiation utilizing photo-isomerization. For the alignment film, those described, for example, in "Liquid Crystal Device Handbook" edited by Japan Society for the Promotion of Science, the 142th Committee, published from Nikkan Kogyo Shinbunsha, 1989, pp 240 to 256 are used.

4-2. Spacer

In the liquid crystal element of the present invention, a space of 1 to 50 μm may be formed between substrates to each other by way of a spacer, and the liquid crystal can be injected into the space. For the spacer, those described, for example, in "Liquid Crystal Device Handbook" edited by Japan Society for the Promotion of Science, the 142th Committee, published from Nikkan Kogyo Shinbunsha, 1989, pp 257 to 262 are used. The liquid crystal composition of the present invention can be disposed between the substrates by coating or printing on the substrate.

4-3. Others

The liquid crystal element of the present invention may further have a white reflection plate, anti-reflection film, brightness improving film, etc.

EXAMPLES

Then, examples are shown below for further describing the present invention more in details but the present invention is not restricted thereto.

Example 1

Preparation of Liquid Crystal Composition-1)

A mixture of 5 mg of a magenta dichroic dye (1-8), 14.8 mg of a smectic liquid crystal (1) which is the specific compound, 75.8 mg of the following dual frequency addressable nematic liquid crystal (H-1) which is described in Applied Physics Letters, Vol. 25, pp 186 to 188 (1974) and 9.4 mg of the following nematic liquid crystal compound (H-2) having negative Δε was heated on a hot plate at 180° C. for one hour, and then cooled to a room temperature to obtain a liquid crystal composition-1.

The liquid crystal composition-1 had a threshold voltage of 6 V/μm and a cross-over frequency of 700 Hz. According to the polarization microscopic observation, the smectic liquid crystal (1) was a compound exhibiting the smectic A phase.

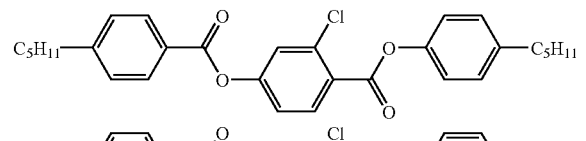

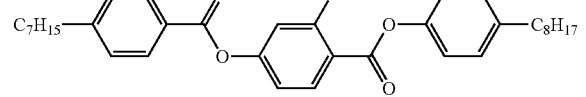

(1:1 mixture)

(H-2)

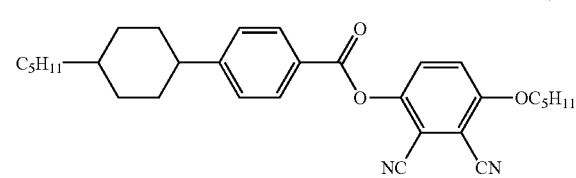

Preparation of Liquid Crystal Composition-2)

6 mg of a yellow dichroic dye (1-2) and 1.2 mg of a cyan dichroic dye (1-14) which are the specific compounds as the dichroic compound and 100 mg of a mixture of a dual frequency addressable smectic liquid crystal described in Mol. Cryst. Liq. Cryst., Vol. 49, pp 83 to 87 (1978) ($R^1$: $C_6H_{13}$ and $R^2$: $C_5H_{11}$ in the following (H-3)) and three types of smectic liquid crystals (H-3) having alkyl chains different from $R^1$ and $R^2$ as the dual frequency addressable smectic liquid crystal composition were mixed, heated on a hot plate at 180° C. for one hour, and then cooled to a room temperature to obtain a liquid crystal composition-2. According to the polarization microscopic observation, the liquid crystal composition-2 was a compound exhibiting the smectic A phase.

The obtained liquid composition-2 had a threshold voltage of 18 V/μm and the cross-over frequency of 1 kHz.

(H-3)

$R_1$—[naphthalene]—C(=O)—O—[phenyl-Cl]—C(=O)—O—[phenyl]—$R_2$

| R1 | R2 | |
|---|---|---|
| $C_6H_{13}$ | $C_5H_{11}$ | 24 wt % |
| $C_6H_{13}$ | $C_{10}H_{21}$ | 28 wt % |
| $C_7H_{15}$ | $C_5H_{11}$ | 24 wt % |
| $C_7H_{15}$ | $C_{10}H_{21}$ | 24 wt % |

Structure of Liquid Crystal Element)

FIG. 4 shows the structure of a liquid crystal element manufactured in this example.

Display layers comprising the liquid crystal composition-1 and the liquid crystal composition-2 in a relationship complementary to each other were inserted between ITO glass substrates (manufactured by EHC Co.), a polystyrene spacer (manufactured by Sekisui Chemical Co.) was inserted to the display layers so as to provide a cell gap of 8 μm and they were laminated by way of a polycarbonate separation substrate of 10 μm thickness between the display layers, and a white scattering plate (manufactured by YUPO Corp. Co). was disposed to the rear face of the glass substrate on the side of the not-display surface.

<Evaluation for Color Display>

Rectangular AC voltages at low frequency (100 Hz) and high frequency (100 kHz) were applied to the manufactured liquid crystal element to conduct color display. The result is shown in Table 3. In the following table, application voltage 1 and application voltage 2 indicate that application voltage 1 was applied and then the application voltage 2 was applied. Further "-" shows no voltage application.

TABLE 3

| Display color | Application voltage 1 (V/μm) | Application voltage 2 (V/μm) |
|---|---|---|
| Black | — | — |
| White | Low frequency: 20 | — |
| Magenta | Low frequency: 20 | High frequency: 10 |
| Green | Low frequency: 10 | — |

As apparent from Table 3, it can be seen that a plurality of layers can be addressable independently by using one pair of electrodes. Further, it was shown that the display color was not changed even left for one week and had memory property after turning off the voltage application.

Example 2

Preparation of Liquid Crystal Composition-3)

A mixture of 6 mg of the yellow dichroic dye (1-2), 14.8 mg of the smectic liquid crystal (1) which is the specified compound, 75.8 mg of the dual frequency addressable nematic liquid crystal (H-1) described in Applied Physics Letters, Vol. 25, pp 186 to 188 (1974), and 9.4 mg of the following nematic liquid crystal compound (H-2) having a negative Δε was heated on a hot plate at 180° C. for one hour, and then it was cooled to a room temperature to obtain a liquid crystal composition-3.

The liquid crystal composition-3 had a threshold voltage of 6 V/μm and the cross-over frequency of 700 Hz.

Preparation of Liquid Crystal Composition-4)

A mixture of 5 mg of the magenta dichroic dye (1-8), 12 mg of the smectic liquid crystal (6) of the specific compound, 78.2 mg of the dual frequency addressable nematic liquid crystal (H-1) described in Applied Physics Letters, Vol. 25, pp 186 to 188 (1974), and 4.8 mg of the following nematic liquid crystal compound (H-2) having a negative Δε was heated on a hot plate at 180° C. for one hour, and then it was cooled to a room temperature to obtain a liquid crystal composition-4.

The liquid crystal composition-4 had a threshold voltage of 9 V/μm and the cross-over frequency of 3.5 kHz. The smectic liquid crystal (6) was a compound exhibiting the smectic A phase under the polarization microscopic observation.

Preparation of Liquid Crystal Composition-5)

1.2 mg of the cyan dichroic dye (1-14) which was the specified compound as the dichroic compound and 100 mg of a mixture of a dual frequency addressable smectic liquid crystal described in Mol. Cryst. Liq. Cryst., Vol. 49, pp 83 to 87 (1978) ($R^1$: $C_6H_{13}$ and $R^2$: $C_5H_{11}$ in the following (H-3)), and three types of smectic liquid crystals (H-3) having alkyl chains different from $R^1$ and $R^2$ as the dual frequency addressable smectic liquid crystal composition were mixed, heated on a hot plate at 180° C. for one hour, and then cooled to a room temperature to obtain a liquid crystal composition-5.

The obtained liquid crystal composition-5 had a threshold voltage of 18 V/μm and the cross-over frequency of 1 kHz.

Structure of Liquid Crystal Element)

A liquid crystal element was manufactured in the same manner as in Example 1.

<Evaluation for Color Display>

Rectangular alternating AC voltages at low frequency (100 Hz) and a high frequency (100 kHz) were applied to the manufactured liquid crystal element to conduct color display. The result is shown in Table 4. In the following table, the application voltage 1, application voltage 2, and the application voltage 3 shows that the application voltage 2 was applied after application of the application voltage 1 and the applied voltage 3 was applied after application of the application voltage 2. Further "-" shows no voltage application.

TABLE 4

| Display color | Application voltage 1 (V/μm) | Application voltage 2 (V/μm) | Application voltage 3 (V/μm) |
|---|---|---|---|
| Black | — | — | — |
| White | Low frequency: 20 | — | — |
| Yellow | Low frequency: 20 | High frequency: 7.5 | — |
| Magenta | Low frequency: 20 | High frequency: 14 | Low frequency: 7.5 |
| Cyan | Low frequency: 14 | — | — |
| Blue | Low frequency: 7.5 | — | — |
| Green | Low frequency: 14 | High frequency: 7.5 | — |
| Red | Low frequency: 20 | High frequency: 14 | — |

As apparent from Table 4, it can be seen that a plurality of layers can be addressable independently by using one pair of electrodes. Further, it was shown that the display color was not changed even left for one week and had a memory property after turning off voltage application. The color reproduction range theoretically reached 100% and the reflectivity was also improved compared with those of the complementary color lamination as the prior art (constitution formed by laminating layers comprising liquid crystal compositions colored yellow, magenta, and cyan, and layers comprising liquid crystal compositions colored to blue, green, and red respectively in a complementary relationship therewith arranged side by side by the number of two).

The foregoing description of the embodiments of the present invention has been provided for the purposes of illustration and description. It is not intended to be exhaustive or to limit the present invention to the precise forms disclosed. Obviously, many modifications and variations will be apparent to practitioners skilled in the art. The embodiments were chosen and described in order to best explain the principles of the present invention and its practical applications, thereby enabling others skilled in the art to understand the present invention for various embodiments and with the various modifications as are suited to the particular use contemplated. It is intended that the scope of the present invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claim is:

1. A liquid crystal element comprising one pair of electrodes of which at least one is a transparent electrode and a liquid crystal layer between the pair of the electrodes, wherein the liquid crystal layer contains at least two compositions of dual frequency addressable smectic liquid crystal compositions having different threshold voltages.

2. A liquid crystal element according to claim 1, wherein the at least two compositions of dual frequency addressable smectic liquid crystal compositions having different threshold voltages have cross-over frequencies that are different from each other respectively.

3. A liquid crystal element according to claim 1, wherein:
    the at least two compositions of dual frequency addressable smectic liquid crystal compositions having different threshold voltages comprise a first dual frequency addressable smectic liquid crystal composition and a second dual frequency addressable smectic liquid crystal composition;
    Ea represents a threshold voltage at a low frequency and E'a represents a threshold voltage at a high frequency of the first dual frequency addressable smectic liquid crystal composition;
    Eb represents a threshold voltage at a low frequency as and E'b represents a threshold voltage at a high frequency of the second dual frequency addressable smectic liquid crystal composition; and
    Ea is smaller than Eb, and E'a is smaller than E'b.

4. A liquid crystal element according to claim 1, wherein the at least two compositions of dual frequency addressable smectic liquid crystal compositions having different threshold voltages contain dichroic dyes respectively, and the absorption of the dichroic dyes has at least one relationship of complementary colors selected from the group consisting of yellow and blue, magenta and green, and cyan and red.

5. A liquid crystal element according to claim 1, wherein the at least two compositions of dual frequency addressable smectic liquid crystal compositions having different threshold voltages comprise a first dual frequency addressable smectic liquid crystal composition, a second dual frequency addressable smectic liquid crystal composition, and a third dual frequency addressable smectic liquid crystal composition having different threshold voltages.

6. A liquid crystal element according to claim 5, wherein:
    Ea represents a threshold voltage at a low frequency and E'a represents a threshold voltage at a high frequency of the first dual frequency addressable smectic liquid crystal composition;
    Eb represents a threshold voltage at a low frequency and E'b represents a threshold voltage at a high frequency of the second dual frequency addressable smectic liquid crystal composition;
    Ec represents a threshold voltage at a low frequency and E'c represents a threshold voltage at a high frequency of the third dual frequency addressable smectic liquid crystal composition; and
    the relationships of Ea <Eb <Ec, and E'a <E'b <E'c are satisfied.

7. A liquid crystal element according to claim 5, wherein the first dual frequency addressable smectic liquid crystal composition, the second dual frequency addressable smectic liquid crystal composition, and third dual frequency addressable smectic liquid crystal composition contain dichroic dyes of different absorptions respectively, and each dichroic dye shows absorption for any one of yellow, magenta, and cyan.

8. A liquid crystal element according to claim 1, wherein the liquid crystal layer is laminated.

9. A liquid crystal element according to claim 8, wherein the liquid crystal layer is a polymer medium layer in which the dual frequency addressable smectic liquid crystal compositions are dispersed in the polymer medium, and the polymer medium layer is laminated.

10. A liquid crystal element according to claim 9, wherein the liquid crystal layer contains the dual frequency addressable smectic liquid crystal compositions in the form of microcapsules.

11. A liquid crystal element according to claim 1, wherein the dual frequency addressable smectic liquid crystal compositions are mixtures of a smectic liquid crystal and a dual frequency addressable nematic liquid crystal.

12. A liquid crystal element according to claim 4, wherein at least one of the dichroic dyes is a dye having a substituent represented by the following Formula (1):

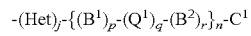

wherein Het represents an oxygen atom or sulfur atom; $B^1$ and $B^2$ each independently represent an arylene group, a heteroarylene group, or a bivalent cycloaliphatic hydrocarbon group; $Q^1$ represents a bivalent linking group; $C^1$ represents an alkyl group, a cycloalkyl group, an alkoxy group, an alkoxycarbonyl group, an acyl group, or an acyloxy group; j represents 0 or 1; p, q, and r each independently represent an integer from 0 to 5; n represents an integer of from 1 to 3; (p +r)×n is an integer of 3 to 10; when p is 2 or larger, two or more groups represented by $B^1$ may be the same or different; and when q is 2 or larger, two or more groups represented by $Q^1$ may be the same or different; when r is 2 or larger, two or more groups represented by $B^2$ may be the same or different; when n is 2 or larger, two or more groups represented by $\{(B^1)_p$-$(Q^1)_q$-$(B^2)_r\}$ may be the same or different 13. A liquid crystal element according to claim 4, wherein the dichroic dye is a compound represented by the following Formula (2):

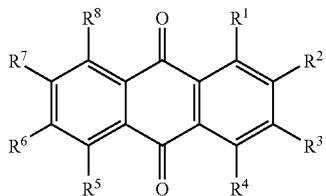

Formula (2)

wherein at least one of $R^1, R^2, R^3, R^4, R^5, R^6, R^7$, and $R^8$ is -(Het)$_j$-{(B$^1$)$_p$-(Q$^1$)$_q$-(B$^2$)$_r$}$_n$-C$^1$ and the remaining groups each independently represent a hydrogen atom or a substituent; Het represents an oxygen atom or a sulfur atom; B$^1$ and B$^2$ each independently represent an arylene group, a heteroarylene group, or a divalent alicyclic hydrocarbon group; Q$^1$ represents a divalent linking group; C$^1$ represents an alkyl group, a cycloalkyl group, an alkoxy group, an alkoxycarbonyl group, an acyl group, or an acyloxy group; j represents 0 or 1; p, q, and r each independently represent an integer of 0 to 5; n represents an integer of 1 to 3; (p+r)×n is an integer of 3 to 10; when p is 2 or larger, two or more groups represented by B$^1$ may be the same or different; when q is 2 or larger, two or more groups represented by Q$^1$ may be the same or different; when r is 2 or larger, two or more groups represented by B$^2$ may be the same or different; and when n is 2 or larger, two or more groups represented by {(B$^1$)$_p$-(Q$^1$)$_q$-(B$^2$)$_r$} may be the same or different.

14. A liquid crystal element according to claim 4, wherein the dichroic dye is a compound represented by the following Formula (3):

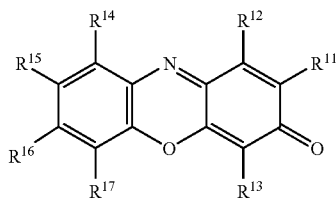

Formula (3)

wherein at least one of $R^{11}, R^{12}, R^{13}, R^{14}, R^{15}, R^{16}$, and $R^{17}$ is -(Het)$_j$-{(B$^1$)$_p$(Q$^1$)$_q$-(B$^2$)$_r$}$_n$-C$^1$ and the remaining groups each independently represent a hydrogen atom or a substituent; Het represents an oxygen atom or a sulfur atom; B$^1$ and B$^2$ each independently represent an arylene group, a heteroarylene group, or a divalent alicyclic hydrocarbon group; Q$^1$ represents a divalent linking group; C$^1$ represents an alkyl group, a cycloalkyl group, an alkoxy group, an alkoxycarbonyl group, an acyl group, or an acyloxy group; j represents 0 or 1; p, q, and r each independently represent an integer of 0 to 5; n represents an integer of 1 to 3; (p+r)×n is an integer of 3 to 10; when p is 2 or larger, two or more groups represented by B$^1$ may be the same or different; when q is 2 or larger, two or more groups represented by Q$^1$ may be the same or different; when r is 2 or larger, two or more groups represented by B$^2$ may be the same or different; and when n is 2 or larger, two or more groups represented by {(B$^1$)$_p$-(Q$^1$)$_q$-(B$^2$)$_r$} may be the same or different.

15. A liquid crystal element according to claim 1, wherein one of the dual frequency addressable smectic liquid crystal compositions contains a compound represented by the following Formula (4):

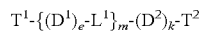

$$T^1\text{-}\{(D^1)_e\text{-}L^1\}_m\text{-}(D^2)_k\text{-}T^2$$

wherein D$^1$ and D$^2$ each independently represent an arylene group, a heteroarylene group, or a bivalent cycloaliphatic hydrocarbon group; L$^1$ represents a bivalent linking group; T$^1$ and T$^2$ each independently represent an alkyl group, an alkoxy group, an alkoxycarbonyl group, an acyl group, an acyloxy group, a halogen atom or a cyano group; e represents an integer of from 1 to 3; m represents an integer of from 1 to 3; and k represents 1 or 2.

16. A liquid crystal element according to claim 15, wherein L$^1$ in the Formula (4) is an ester group or an alkyleneoxy group.

17. A liquid crystal element according to claim 15, wherein the combination of e, m, and k in the Formula (4) is any one of the following (i) to (iii):

(i) e=1, m=2, and k=1;
(ii) e=2, m=1, and k=1; or
(iii) e=2, m=1, and k=2.

18. A liquid crystal element according to claim 11, wherein the mixing ratio of the dual frequency addressable nematic liquid crystal and the smectic liquid crystal is from 20 mol %: 80 mol % to 99 mol %: 1 mol %.

19. A liquid crystal element according to claim 11, wherein the mixing ratio of the dual frequency addressable nematic liquid crystal and the smectic liquid crystal is from 70 mol %: 30 mol % to 90 mol %: 10 mol %.

* * * * *